(12) United States Patent
Sasaki et al.

(10) Patent No.: US 9,606,300 B2
(45) Date of Patent: Mar. 28, 2017

(54) ADAPTER AND OPTICAL CONNECTOR COUPLING SYSTEM

(71) Applicant: SUMITOMO ELECTRIC INDUSTRIES, LTD., Osaka-shi, Osaka (JP)

(72) Inventors: Dai Sasaki, Yokohama (JP); Osamu Shimakawa, Yokohama (JP); Hajime Arao, Yokohama (JP); Takuro Watanabe, Yokohama (JP); Motoyoshi Kimura, Komaki (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/940,598

(22) Filed: Nov. 13, 2015

(65) Prior Publication Data
US 2016/0139342 A1 May 19, 2016

(30) Foreign Application Priority Data
Nov. 14, 2014 (JP) .................................. 2014-232172

(51) Int. Cl.
*G02B 6/38* (2006.01)
*G02B 6/32* (2006.01)

(52) U.S. Cl.
CPC ......... *G02B 6/3825* (2013.01); *G02B 6/3882* (2013.01); *G02B 6/3885* (2013.01); *G02B 6/32* (2013.01); *G02B 6/3853* (2013.01); *G02B 6/3861* (2013.01); *G02B 6/3866* (2013.01)

(58) Field of Classification Search
CPC ................................ G02B 6/38; G02B 6/3825

USPC ............................................................ 385/60
See application file for complete search history.

(56) References Cited

U.S. PATENT DOCUMENTS

| 6,402,388 | B1* | 6/2002 | Imazu et al. ............ 385/60 |
| 6,456,774 | B1* | 9/2002 | Lin ..................... 385/140 |
| 6,619,856 | B1* | 9/2003 | Lampert et al. ......... 385/78 |
| 6,682,230 | B1* | 1/2004 | Demangone et al. ..... 385/88 |
| 8,956,056 | B2* | 2/2015 | Katagiyama et al. ..... 385/72 |
| 2002/0041738 | A1* | 4/2002 | Carberry et al. ........ 385/56 |
| 2003/0215190 | A1* | 11/2003 | Lampert et al. ......... 385/77 |
| 2004/0223701 | A1* | 11/2004 | Tanaka et al. .......... 385/55 |

(Continued)

FOREIGN PATENT DOCUMENTS

WO    WO-2012/174227 A2    12/2012

*Primary Examiner* — Kaveh C Kianni
(74) *Attorney, Agent, or Firm* — Drinker Biddle & Reath LLP

(57) ABSTRACT

An adapter includes an optical connector accommodation part having a first cavity in which a first optical connector having a first front end portion is to be accommodated, and a second cavity in which a second optical connector having a second front end portion is to be accommodated, and a spacer having a first surface configured to contact the first front end portion, a second surface configured to contact the second front end portion, and a light transmission part configured to enable a light beam to pass therethrough. The spacer being arranged between the first cavity and the second cavity. At a state where the first front end portion is contacted to the first surface and the second front end portion is contacted to the second surface, the first optical interface part and the second optical interface part face each other at a predetermined interval.

9 Claims, 15 Drawing Sheets

(56) References Cited

U.S. PATENT DOCUMENTS

| | | | |
|---|---|---|---|
| 2008/0317414 A1* | 12/2008 | Nakagawa | 385/76 |
| 2008/0317428 A1* | 12/2008 | Nakagawa | 385/139 |
| 2009/0060422 A1* | 3/2009 | Lin et al. | 385/78 |
| 2010/0239220 A1* | 9/2010 | Lin et al. | 385/134 |
| 2011/0198324 A1 | 8/2011 | de Jong et al. | |
| 2012/0076459 A1* | 3/2012 | Sell | 385/76 |
| 2012/0141070 A1* | 6/2012 | Sabo | 385/60 |
| 2012/0141074 A1* | 6/2012 | Sabo | 385/78 |
| 2012/0321266 A1* | 12/2012 | Lin et al. | 385/134 |
| 2013/0064517 A1* | 3/2013 | Lin et al. | 385/134 |
| 2013/0071067 A1* | 3/2013 | Lin | 385/75 |
| 2013/0071068 A1* | 3/2013 | Lin | 385/75 |
| 2013/0084041 A1* | 4/2013 | Lin et al. | 385/56 |
| 2014/0133803 A1 | 5/2014 | Rosenberg et al. | |
| 2014/0147082 A1* | 5/2014 | Lee | 385/78 |
| 2015/0241644 A1* | 8/2015 | Lee | 385/134 |

\* cited by examiner

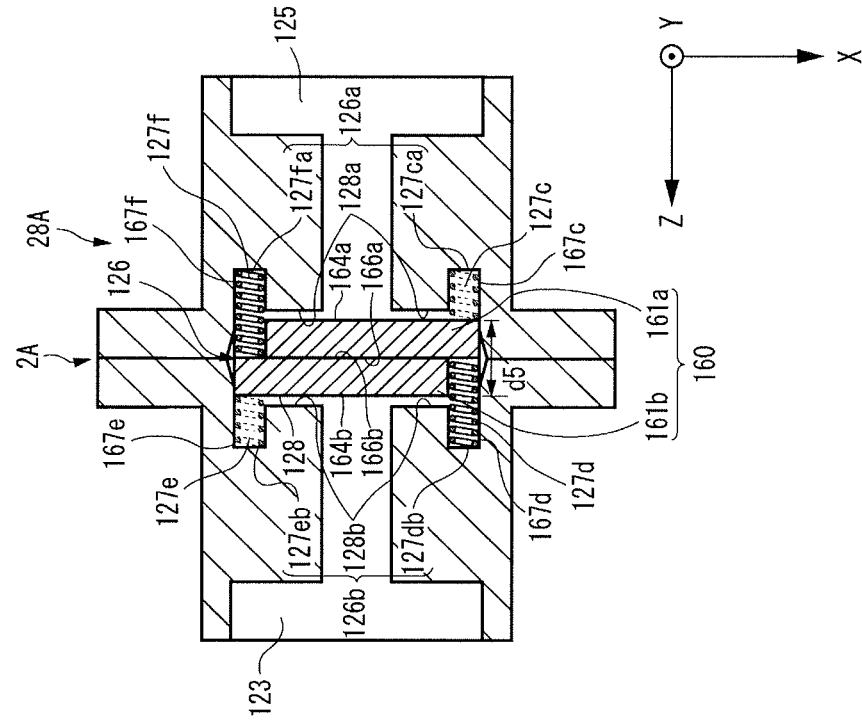
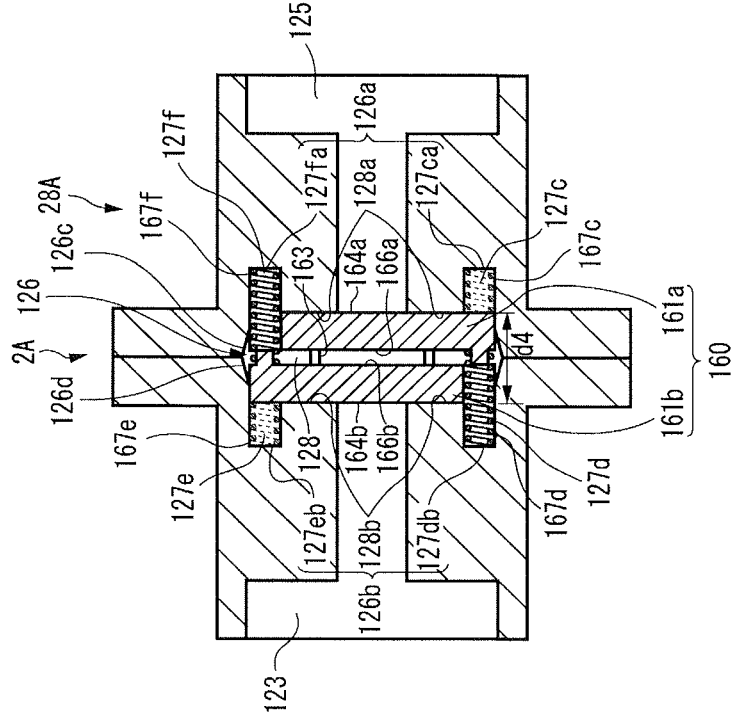

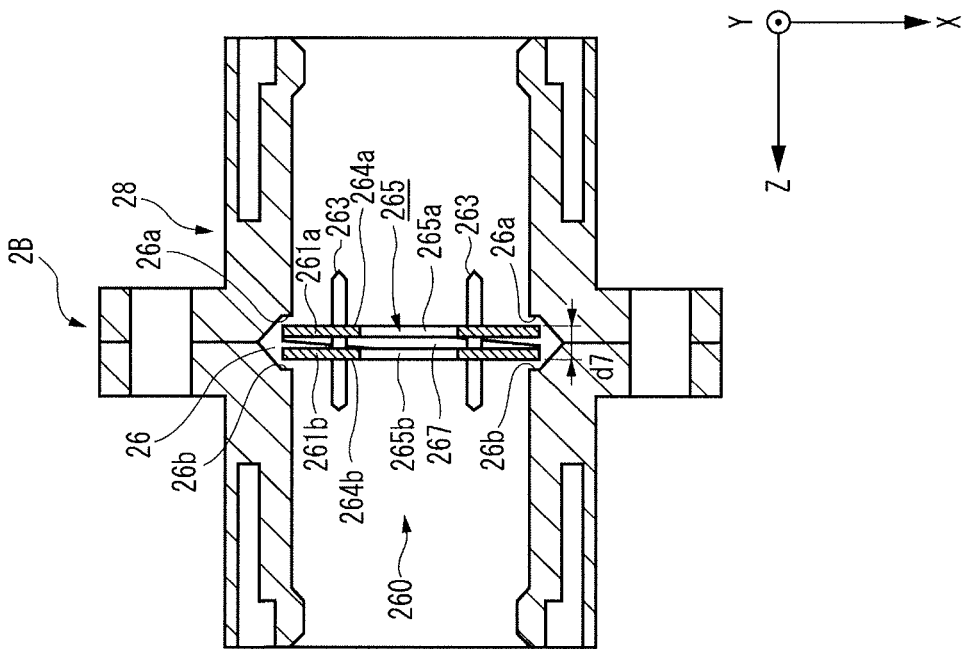
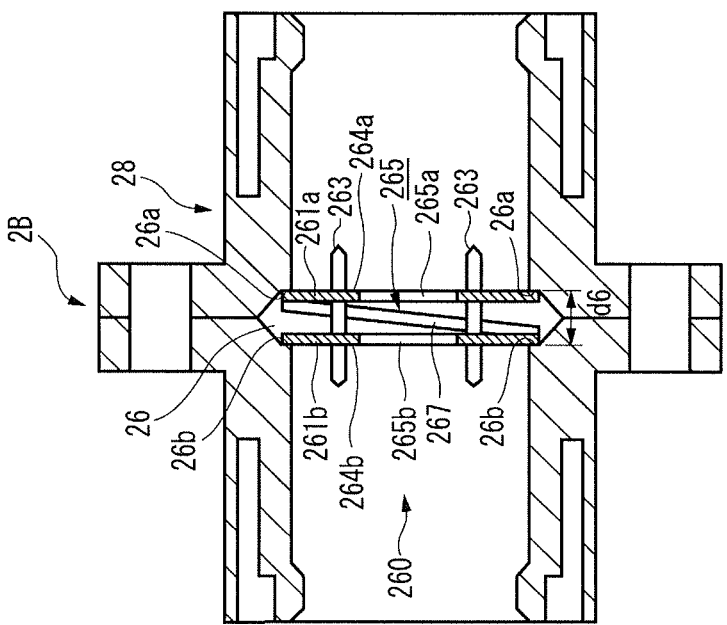

ADAPTER AND OPTICAL CONNECTOR COUPLING SYSTEM

CROSS-REFERENCE TO RELATED APPLICATION

The present application claims priority from Japanese Patent Application No. 2014-232172 filed on Nov. 14, 2014, the entire content of which is incorporated herein by reference.

BACKGROUND

Technical Field

The present disclosure relates to an adapter and an optical connector coupling system.

Related Art

A ferrule assembly with a multi fiber lens has been known which includes two ferrules configured to hold a plurality of optical fibers and an adapter configured to accommodate therein the two ferrules with the two ferrules being arranged to face each other (for example, refer to Patent Document 1). In the ferrule assembly disclosed in Patent Document 1, the two ferrules are arranged to face each other so that end surfaces of the respective ferrules are contacted to each other, and are thus positioned with respect to each other.

In the meantime, in order to optically couple two optical interface parts having lenses optically coupled with the optical fibers, it is required to form a predetermined interval between the two optical interface parts. Therefore, it is necessary to arrange each optical interface part at a position recessed from the ferrule end surface.

[Patent Document 1] International Patent Application Publication No. WO 2012/174227

However, according to the ferrule of the ferrule assembly disclosed in Patent Document 1, since an optical interface surface is arranged at the position recessed from the ferrule end surface, it is difficult to remove the dust and the like accumulated on the optical interface surface, so that it is very troublesome to clean the optical interface surface. Due to this, the high load is caused as regards the maintenance of the ferrule. Also, according to the ferrule assembly, it is necessary to form a recess portion on the ferrule end surface.

SUMMARY

Exemplary embodiments of the invention provide an adapter capable of increasing a degree of design freedom of an optical connector.

An adapter according to an exemplary embodiment, comprises:
an optical connector accommodation part having:
  a first cavity in which a first optical connector having a first front end portion is to be accommodated, and
  a second cavity in which a second optical connector having a second front end portion is to be accommodated; and
a spacer having:
  a first surface configured to contact the first front end portion;
  a second surface positioned at an opposite side to the first surface and configured to contact the second front end portion, and
  a light transmission part configured to enable a light beam, which propagates between a first optical interface part provided at the first front end portion and a second optical interface part provided at the second front end portion, to pass therethrough, and
the spacer being arranged between the first cavity and the second cavity,
wherein at a state where the first front end portion is contacted to the first surface and the second front end portion is contacted to the second surface, the first optical interface part and the second optical interface part face each other at a predetermined interval.

According to the exemplary embodiment of the invention, it is possible to provide the adapter capable of increasing the degree of design freedom of the optical connector.

BRIEF DESCRIPTION OF THE DRAWINGS

FIG. 11A is a sectional view depicting the adapter of the first modified example at the state (first state) before the first optical connector and the second optical connector are positioned with respect to each other through the spacer.

FIG. 11B is a sectional view depicting the adapter of the first modified example at the state (second state) after the first optical connector and the second optical connector are positioned with respect to each other through the spacer.

FIG. 12A is a sectional view depicting an adapter according to a second modified example of the first exemplary embodiment at the first state.

FIG. 12B is a sectional view depicting the adapter of the second modified example at the second state.

DETAILED DESCRIPTION

Figure 1:
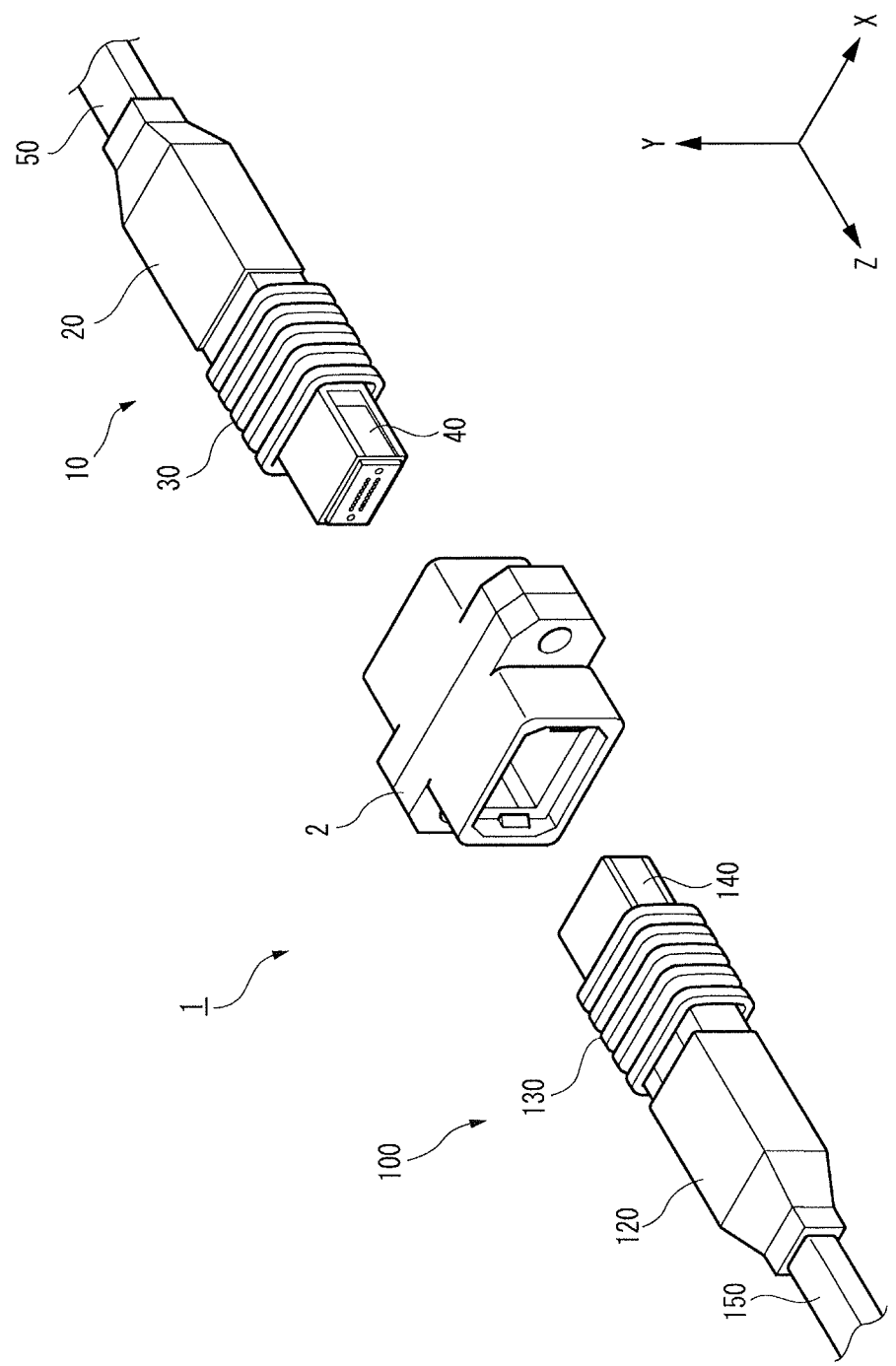
FIG. 1 is an exploded perspective view depicting an optical connector coupling system having an adapter according to a first exemplary embodiment of the present invention.

[Description of Exemplary Embodiments of Present Invention]

An outline of exemplary embodiments of the present invention is described.

(1) An adapter including:
an optical connector accommodation part having:
a first cavity in which a first optical connector having a first front end portion is to be accommodated, and
a second cavity in which a second optical connector having a second front end portion is to be accommodated, and
a spacer having:
a first surface configured to contact the first front end portion;
a second surface positioned at an opposite side to the first surface and configured to contact the second front end portion, and
a light transmission part configured to enable a light beam, which propagates between a first optical interface part provided at the first front end portion and a second optical interface part provided at the second front end portion, to pass therethrough, and
the spacer being arranged between the first cavity and the second cavity,
wherein at a state where the first front end portion is contacted to the first surface and the second front end portion is contacted to the second surface, the first optical interface part and the second optical interface part face each other at a predetermined interval.

According to the above configuration, it is possible to provide the adapter capable of increasing a degree of design freedom of the optical connector.

(2) In the adapter described in the above (1), the optical connector accommodation part further has a third cavity formed between the first cavity and the second cavity, the spacer is accommodated in the third cavity, at a first state before the first optical connector and the second optical connector are positioned with respect to each other through the spacer, the first surface and second surface of the spacer are contacted to inner wall surfaces defining the third cavity, and at a second state after the first optical connector and the second optical connector are positioned with respect to each other through the spacer, the first surface and second surface of the spacer are spaced from the inner wall surfaces.

According to the above configuration, it is possible to provide the adapter of which reliability against an external force is improved.

(3) In the adapter described in the above (2), a distance between the first surface and the second surface at the second state is less than a distance between the first surface and the second surface at the first state.

According to the above configuration, it is possible to provide the adapter of which reliability against an external force is improved.

(4) In the adapter described in the above (2) or (3), the spacer further has:
a first spacer part having the first surface;
a second spacer part having the second surface, and
a spacer elastic member configured to elastically couple the first spacer part and the second spacer part.

According to the above configuration, it is possible to implement a state where the first surface and second surface of the spacer are contacted to or spaced from the inner wall surfaces of the third cavity, by the relatively simple spacer structure.

(5) In the adapter described in the above (2) or (3), the inner wall surfaces of the third cavity have a first inner wall surface facing the first surface and a second inner wall surface facing the second surface, and
the spacer further has:
a first spacer part having the first surface;
a second spacer part having the second surface, and
an elastic member configured to elastically couple the first spacer part and the second inner wall surface and to elastically couple the second spacer part and the first inner wall surface.

According to the above configuration, it is possible to provide the adapter that can be easily handled.

(6) In the adapter described in one of the above (1) to (5), the spacer further has a guide pin, and
at a state where the guide pin is inserted into a guide hole formed at the first optical connector and a guide hole formed at the second optical connector, the first optical connector and the second optical connector are positioned with respect to each other.

According to the above configuration, it is possible to further increase the degree of design freedom of the optical connector by using the above adapter.

(7) An optical connector coupling system including:
a first optical connector including:
a first ferrule having a first holding part configured to hold an end portion of a first optical fiber and a first end portion having a first optical interface part optically coupled with the first optical fiber, and
a first housing configured to accommodate therein the first ferrule;
a second optical connector including:
a second ferrule having a second holding part configured to hold an end portion of a second optical fiber and a second end portion having a second optical interface part optically coupled with the second optical fiber, and
a second housing configured to accommodate therein the second ferrule, the second optical connector being arranged to face the first optical connector, and
the adapter according to one of the above (1) to (6),
wherein the first optical interface part protrudes from the first housing in an insertion direction in which the first optical connector is to be inserted into the adapter, and
wherein the second optical interface part protrudes from the second housing in an insertion direction in which the second optical connector is to be inserted into the adapter.

According to the above configuration, it is possible to provide the optical connector coupling system capable of increasing the degree of design freedom of the optical connector.

(8) In the optical connector coupling system described in the above (7), the adapter is engaged with the first housing and the second housing, and
at a state where the first ferrule and the second ferrule are positioned and coupled with respect to each other, the first ferrule is accommodated in the first housing so that it can move relative to the first housing, and the second ferrule is accommodated in the second housing so that it can move relative to the second housing.

According to the above configuration, it is possible to provide the adapter having improved the reliability.

(9) In the optical connector coupling system described in the above (7) or (8), the first optical interface part is configured to optically couple with the first optical fiber and to expand the light beam emitted from the first optical fiber, the second optical interface part is configured to optically couple with the second optical fiber and to condense the light beam emitted from the first optical interface part on the second optical fiber, the first optical fiber and the second optical fiber are single mode optical fibers, the spacer further has a guide pin for a multimode optical fiber, and at a state where the guide pin is inserted into a guide hole formed at the first optical connector and a guide hole formed at the second optical connector, the first optical connector and the second optical connector are positioned with respect to each other.

According to the above configuration, it is possible to provide the optical connector coupling system capable of saving the manufacturing cost.

(10) In the optical connector coupling system described in the above (7) or (8), the adapter is the adapter described in the above (4), the first optical connector further has a first elastic member configured to press the first ferrule so that the first front end portion is contacted to the first surface of the spacer, the second optical connector further has a second elastic member configured to press the second ferrule so that the second front end portion is contacted to the second surface of the spacer, and at the second state, elastic forces of the first elastic member and the second elastic member are higher than an elastic force of the spacer elastic member.

According to the above configuration, it is possible to provide the optical connector coupling system capable of securely optically coupling the optical connectors arranged to face each other.

[Details Of Exemplary Embodiments Of Present Invention]

(First Exemplary Embodiment)

Hereinafter, a first exemplary embodiment of the present invention will be described with reference to the drawings. In the descriptions of the exemplary embodiment, the descriptions of the members having the same reference numerals as the already described members are omitted for convenience of explanations. Also, the sizes of the respective members shown in the drawings may be different from the sizes of the actual members for convenience of explanations.

Also, in the descriptions of the exemplary embodiment, an X-axis direction, a Y-axis direction, and a Z-axis direction are appropriately mentioned so as to easily understand the present invention. The directions are relative directions set for an optical connector coupling system 1 shown in FIG. 1. Therefore, it should be noted that when the optical connector coupling system 1 shown in FIG. 1 is rotated in a predetermined direction, at least one of the X-axis direction, the Y-axis direction, and the Z-axis direction is changed.

Here, the X-axis direction includes a +X direction ('+' direction is set as a vector direction) and a −X direction. Likewise, the Y-axis direction includes a +Y direction and a −Y direction, and the Z-axis direction includes a +Z direction and a −Z direction. In the meantime, when describing a specific direction (vector), the direction is explicitly denoted as the +X direction, the −Y direction, and the like.

FIG. 1 is an exploded perspective view depicting the optical connector coupling system 1 having an adapter 2 according to the first exemplary embodiment of the present invention. As shown in FIG. 1, the optical connector coupling system 1 has an optical cable 50, an optical cable 150, a first optical connector 10, a second optical connector 100 and the adapter 2.

The first optical connector 10 has a boots 20, a first housing 30, and a first ferrule 40. The second optical connector 100 has a boots 120, a second housing 130, and a second ferrule 140. In this exemplary embodiment, the second optical connector 100 has the same configuration as the first optical connector 10. Therefore, in the below descriptions, only a structure of the first optical connector 10 will be described. Also, the optical cable 50 that is to be connected to the first optical connector 10 has the same configuration as the optical cable 150 that is to be connected to the second optical connector 100.

The adapter 2 is configured to accommodate therein the first optical connector 10 and the second optical connector 100 with the first optical connector 10 and the second optical connector 100 facing each other. At a state where the first optical connector 10 and the second optical connector 100 are accommodated in the adapter 2, the first housing 30 and the second housing 130 are engaged with the adapter 2.

Figure 2:
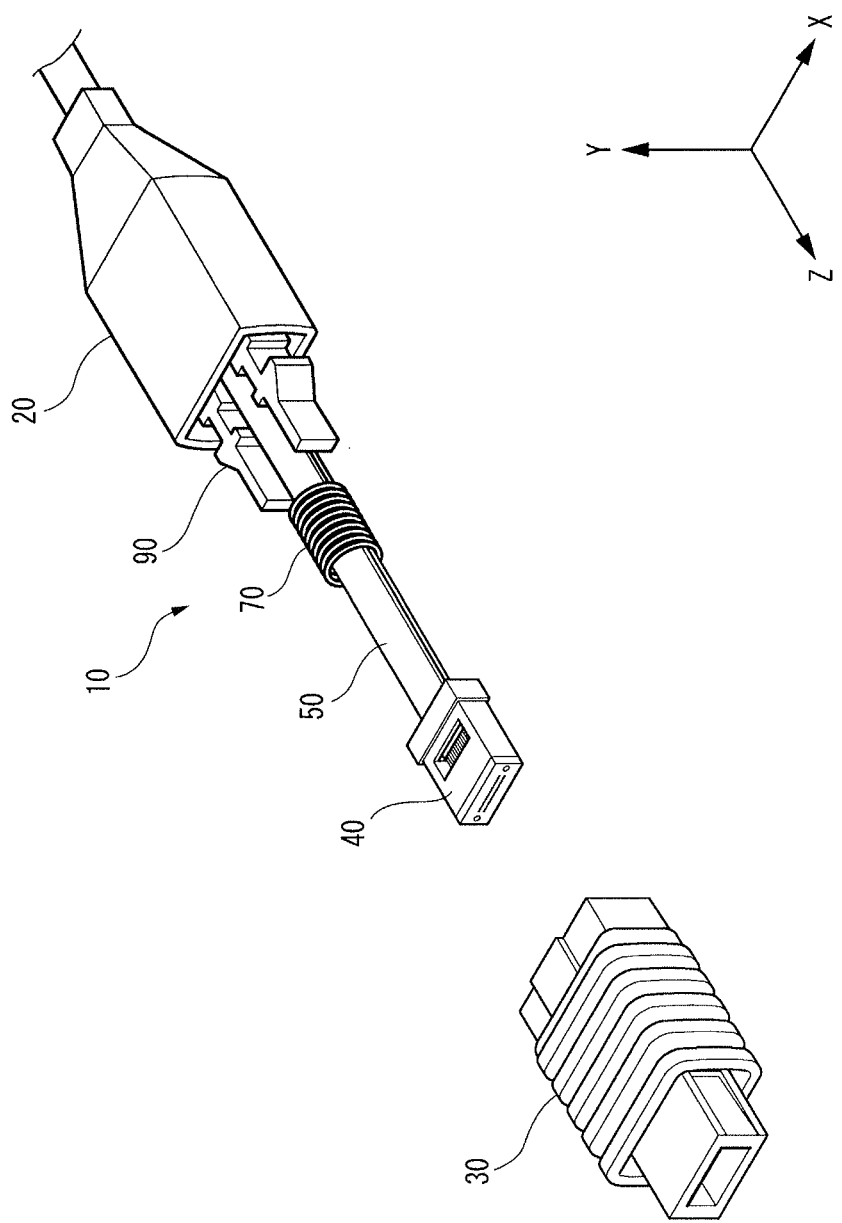
FIG. 2 is an exploded perspective view depicting a first optical connector.

FIG. 2 is an exploded perspective view depicting the first optical connector 10. As shown in FIG. 2, the first optical connector 10 further has a spring 70 (first elastic member) and a latch 90.

The latch 90 is connected to the boots 20 and is configured to be engaged with the first housing 30. The spring 70 is configured to apply an elastic force to the first ferrule 40 in the +Z direction. The first housing 30 is engaged with the latch 90, so that the first housing 30 accommodates therein the first ferrule 40 and the spring 70.

Figure 3:
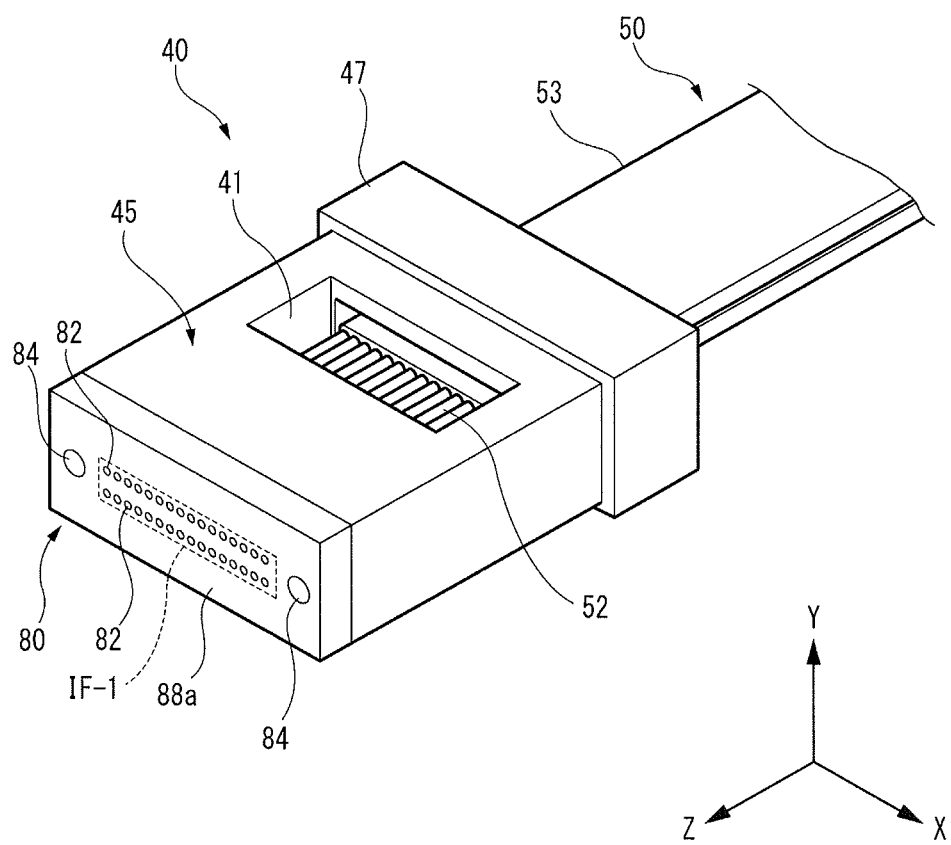
FIG. 3 is an enlarged perspective view depicting a first ferrule shown in FIG. 2 and the vicinity thereof.
Figure 4:
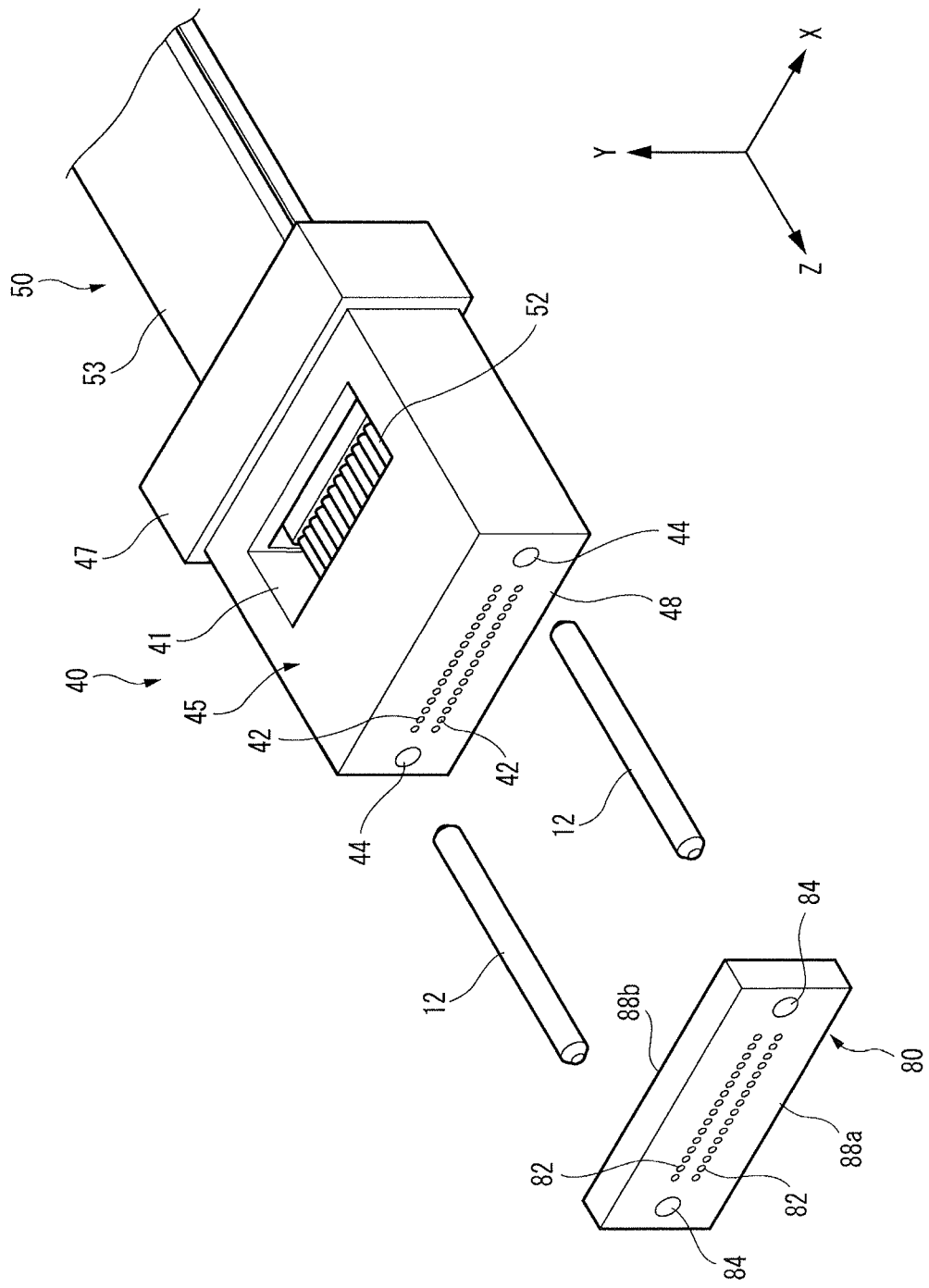
FIG. 4 is a perspective view for illustrating a process of fixing a first optical interface part to the first ferrule.

The first ferrule 40 is described with reference to FIGS. 3 and 4. FIG. 3 is an enlarged perspective view depicting the first ferrule 40 shown in FIG. 2 and the vicinity thereof. FIG. 4 is a perspective view for illustrating a process of fixing a first lens array 80 to the first ferrule 40.

The optical cable 50 has a plurality of first optical fibers 52 arranged in parallel in the X-axis direction, and a covering 53 configured to integrally cover the plurality of first optical fibers 52. In this exemplary embodiment, the optical cable 50 is held by the first ferrule 40 with being piled up in two stages in the Y-axis direction. Meanwhile, in the below descriptions, the optical cable 50 piled up in two stages is simply referred to as the optical cable 50 without particularly discriminating the same, for convenience of explanations.

The plurality of first optical fibers 52 is exposed from the covering 53 at an end portion of the optical cable 50. The first optical fiber 52 has a core layer through which the light propagates and a cladding layer configured to cover the core layer. In this exemplary embodiment, the first optical fiber 52 is a single mode optical fiber. However, a multimode optical fiber may also be applied.

The first ferrule 40 has a first main body part 45 configured to hold end portions of the first optical fibers 52, and a first lens array 80 (first front end portion). The first main body part 45 has a window part 41, a plurality of optical fiber holding holes 42 arranged in parallel in the X-axis direction, a pair of guide pin insertion holes 44, and a rear end portion 47. The first main body part 45 shown in FIG. 3 is an MT-type ferrule. However, the shape of the first main body part 45 is not limited thereto. The rear end portion 47 has a substantially cuboid shape and is configured so that an insertion opening (not shown) into which the optical cable 50 is inserted communicates with the optical fiber holding holes 42.

As shown in FIG. 4, the respective optical fiber holding holes 42 and the pair of guide pin insertion holes 44 are formed to extend in the Z-axis direction at the first main body part 45. The respective first optical fibers 52 exposed from the covering 53 and separated into a single fiber are inserted into the corresponding optical fiber holding holes 42, so that they are guided towards a front surface 48 of the first main body part 45. The respective first optical fibers 52 are fixed to the first ferrule 40 by an adhesive supplied from the window part 41. In this way, the respective first optical fibers 52 are held by the corresponding optical fiber holding holes 42.

Also, the front surface 48 is ground, for example, so that the end surfaces of the respective first optical fibers 52 are flush with the front surface 48 of the first ferrule 40.

The first lens array 80 has a first optical interface part IF-1 configured to expand and emit light beams emitted from the first optical fibers 52, and a pair of guide holes 84. The first optical interface part IF-1 has a plurality of GRIN (Gradient-Index) lenses 82 arranged in parallel in the X-axis direction. Also, the first lens array 80 has a front surface 88a, and a rear surface 88b positioned at an opposite side to the front surface 88a. The GRIN lenses 82 are held to extend from the front surface 88a to the rear surface 88b in the Z-axis direction in the first lens array 80. The front surface 88a and the rear surface 88b are smoothed by the grinding, for example.

The first lens array 80 is arranged on the first main body part 45 so that the rear surface 88b is contacted to the front surface 48 of the first main body part 45. At a state where the first lens array 80 is arranged on the front surface 48, the respective GRIN lenses 82 are positioned with respect to the end surfaces of the first optical fibers 52 accommodated in the corresponding optical fiber holding holes 42.

The GRIN lenses 82 are configured so that a refractive index thereof gradually changes from a central part towards an outer periphery. Also, the GRIN lenses 82 are configured to expand the light beams emitted from the first optical fibers 52. For example, the GRIN lenses 82 are configured to collimate the diverging lights emitted from the first optical fibers 52 and to emit the parallel lights in the +Z direction. Also, the GRIN lenses 82 are configured to condense the light beams, which are the parallel lights incident to the GRIN lenses 82 of the first optical interface part IF-1 from a second optical interface part IF-2, and to couple the same with the first optical fibers 52.

Next, a process of arranging the first lens array 80 on the front surface 48 of the first main body part 45 is described with reference to FIG. 4. At a state where a pair of jig guide pins 12 is respectively inserted into the corresponding guide pin insertion holes 44 and guide holes 84, the first lens array 80 is temporarily arranged on the front surface 48. At this state, the respective GRIN lenses 82 are positioned with respect to the end surfaces of the corresponding first optical fibers 52. Thereafter, the adhesive is supplied between the rear surface 88b of the first lens array 80 and the front surface 48 of the first main body part 45, so that the first lens array 80 is fixed to the first main body part 45 by the adhesive. Finally, the pair of jig guide pins 12 is respectively taken out from the corresponding guide pin insertion holes 44 and guide holes 84.

In this way, since the respective GRIN lenses 82 are positioned with respect to the end surfaces of the corresponding first optical fibers 52, the respective GRIN lenses 82 are optically coupled with the corresponding first optical fibers 52. Also, since the respective guide holes 84 are positioned with respect to the corresponding guide pin insertion holes 44, the respective guide holes 84 communicate with the corresponding guide pin insertion holes 44.

Since axis deviation between the first optical fiber 52 and the GRIN lens 82 causes angle deviation of the light beam emitted from the GRIN lens 82 or the light beam incident to the first optical fiber 52 from the GRIN lens 82, it highly influences the optical characteristics. Therefore, it is preferably use a guide pin for a single mode optical fiber as the jig guide pin 12.

The guide pin for a single mode optical fiber is manufactured so that an error of an outer diameter of the guide pin at each position in an axis direction thereof as regards a predetermined design value is equal to or less than ±0.5 µm. A diameter of the jig guide pin 12 indicates an average value of the outer diameters in the axis direction when an outer diameter varies in the axis direction. In this way, the guide pin for a single mode optical fiber is used, so that it is possible to suppress the positional deviation between the end surface of the first optical fiber 52 and the GRIN lens 82 within a range of ±0.5 µm or less. At this time, a difference between the diameter of the jig guide pin 12 and inner diameters of the guide pin insertion hole 44 and the guide holes 84 can be set to 1 µm or less, for example. Thereby, it is possible to precisely position the first main body part 45 and the first lens array 80 by setting the deviation of the central positions of the guide pin insertion hole 44 of the first main body part 45 and the guide hole 84 of the first lens array 80 to 1 µm or less, for example. Also, since the jig guide pin 12 manufactured with high precision can be used to manufacture another first ferrule 40 after manufacturing the first ferrule 40, it is possible to save the manufacturing cost.

Figure 5:
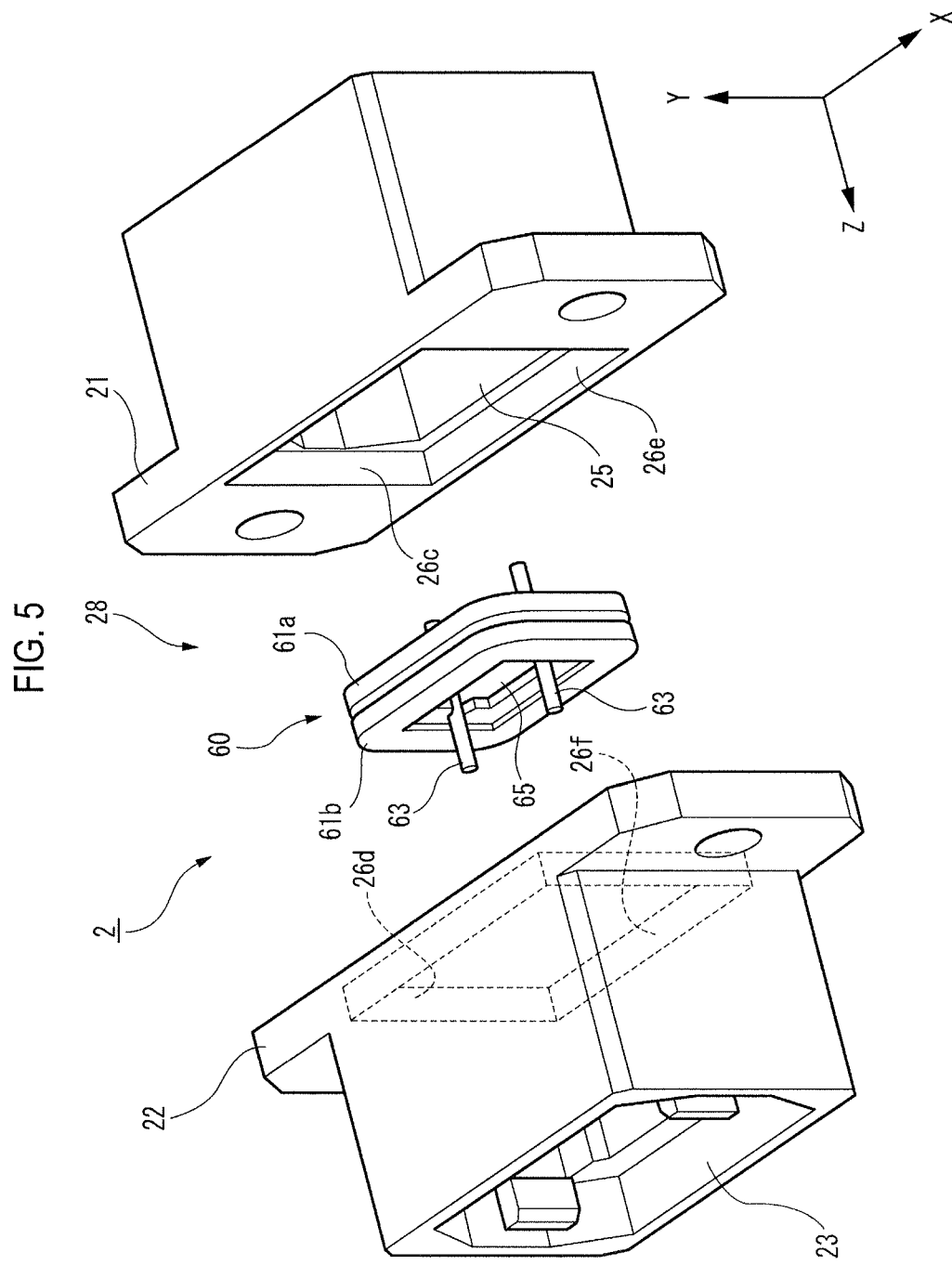
FIG. 5 is an exploded perspective view depicting the adapter according to the first exemplary embodiment.

Next, the adapter 2 is described with reference to FIG. 5. FIG. 5 is an exploded perspective view of the adapter 2 shown in FIG. 1. As shown in FIG. 5, the adapter 2 has an optical connector accommodation part 28 and a spacer 60. The optical connector accommodation part 28 has a first optical connector accommodation part 21 and a second optical connector accommodation part 22. The first optical connector accommodation part 21 has a first cavity 25 in which the first optical connector 10 is to be accommodated. The second optical connector accommodation part 22 has a second cavity 23 in which the second optical connector 100 is to be accommodated. The first optical connector accommodation part 21 and the second optical connector accommodation part 22 are positioned and fixed each other so as to accommodate the spacer 60, thereby forming the optical connector accommodation part 28.

The spacer 60 is accommodated in the optical connector accommodation part 28 so that it is arranged between the first cavity 25 and the second cavity 23. The spacer 60 has a first spacer part 61a, a second spacer part 61b, and a pair of guide pins 63. Also, the spacer 60 has an opening 65 (an example of the light transmission part) extending in the Z-axis direction.

Figure 6:
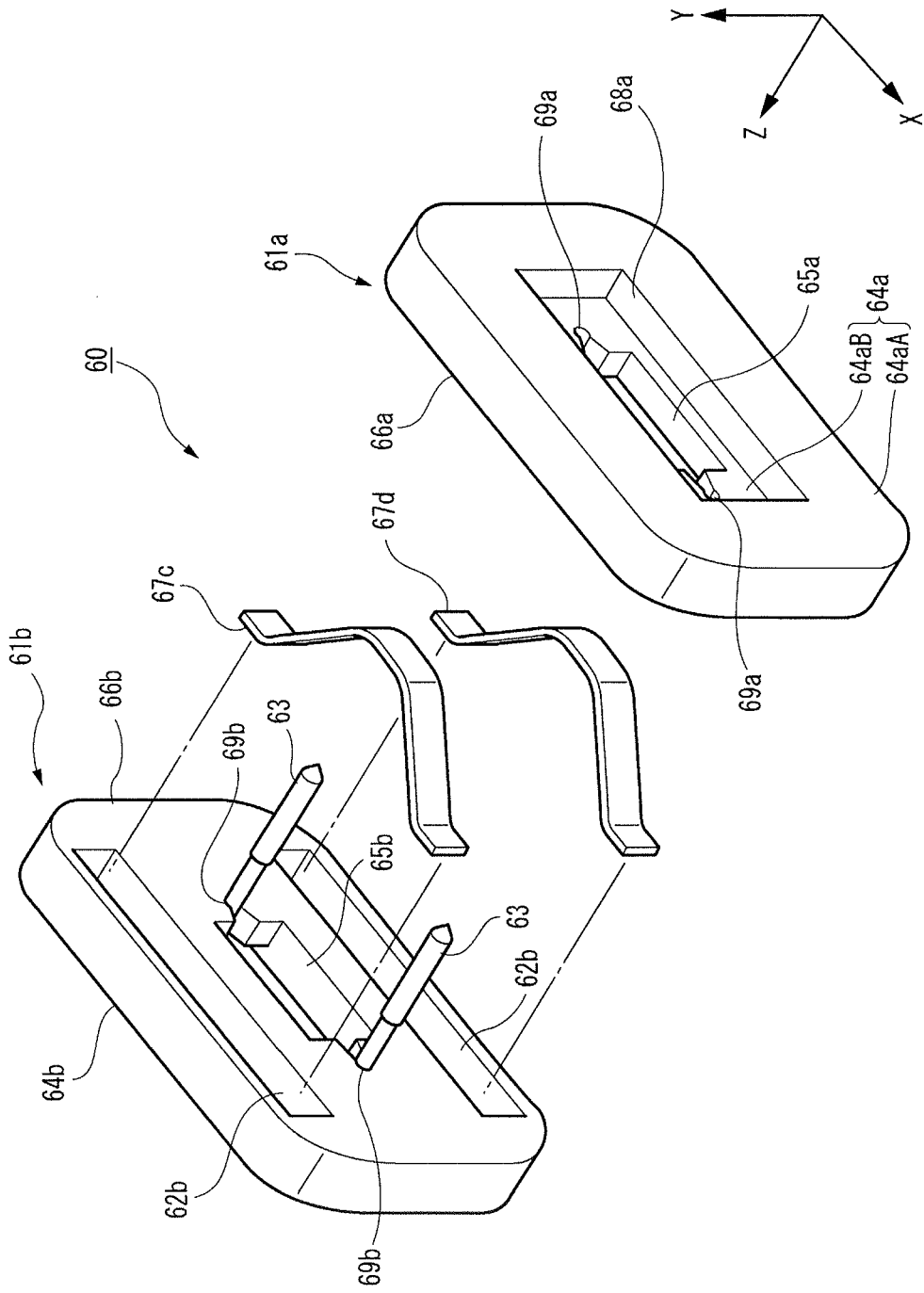
FIG. 6 is an exploded perspective view of a spacer of the adapter according to the first exemplary embodiment.

A structure of the spacer 60 is further described with reference to FIGS. 6 and 7. FIG. 6 is an exploded perspective view of the spacer 60. As shown in FIG. 6, the first spacer part 61a and the second spacer part 61b have the same configuration. The first spacer part 61a has an outer surface 64a (a first surface of the spacer 60), an inner surface 66a, a recess portion 68a, and an opening 65a. The outer surface 64a functioning as the first surface of the spacer 60 has an outermost surface 64aA, and a bottom surface 64aB of the recess portion 68a.

The inner surface 66a is positioned at an opposite side to the outer surface 64a. The recess portion 68a having a substantially cuboid shape is formed at the outermost surface 64aA of the first spacer part 61a and communicates with the opening 65a. Both ends of the opening 65a in the X-axis direction are formed with guide pin holding holes 69a for holding the guide pins 63, and the respective guide pin holding holes 69a communicate with the opening 65a. The opening 65a configures a part of the opening 65 of the spacer 60.

The second spacer part 61b has an outer surface 64b (a second surface of the spacer 60), an inner surface 66b, a recess portion 68b (refer to FIG. 7), an opening 65b, and a plate spring accommodation part 62b. As shown in FIG. 7, the outer surface 64b functioning as the second surface of the spacer 60 has an outermost surface 64bA, and a bottom surface 64bB of the recess portion 68b.

The inner surface 66b is positioned at an opposite side to the outer surface 64b and faces the inner surface 66a of the first spacer part 61a. The recess portion 68b (refer to FIG. 7) having the same shape as the recess portion 68a is formed at the outermost surface 64bA of the second spacer part 61b and communicates with the opening 65b. Both ends of the opening 65b in the X-axis direction are formed with guide pin holding holes 69b for holding the guide pins 63, and the respective guide pin holding holes 69b communicate with the opening 65b. The opening 65b configures a part of the opening 65 of the spacer 60.

Also, the spacer 60 further has plate springs 67c, 67d (spacer elastic members) bent into a convex shape and having an elastic property. The plate springs 67c, 67d are configured to elastically couple the first spacer part 61a and the second spacer part 61b.

When the first spacer part 61a and the second spacer part 61b are coupled to each other through the guide pins 63, two plate spring accommodation spaces configured to accommodate therein the plate springs 67c, 67d are formed by the two plate spring accommodation parts 62b of the second spacer part 61b and two plate spring accommodation parts (not shown) of the first spacer part 61a. In this way, at a state where the plate springs 67c, 67d are accommodated in the plate spring accommodation spaces, the first spacer part 61a and the second spacer part 61b are elastically coupled to each other through the plate springs 67c, 67d.

Also, when a pressing force is not applied to the first spacer part 61a and the second spacer part 61b of the spacer 60 in the Z-axis direction, the first spacer part 61a and the second spacer part 61b are arranged to face each other with being spaced from each other. On the other hand, when the pressing force of the +Z direction is applied to the first spacer part 61a and/or when the pressing force of the −Z direction is applied to the second spacer part 61b, the plate springs 67c, 67d are elastically deformed, are elongated in the X-axis direction and are reduced as regards width sizes in the Z-axis direction. In this way, it is possible to reduce a distance between the first spacer part 61a and the second spacer part 61b by the elastic deformation of the plate springs 67c, 67d.

When the higher pressing force of the Z-axis direction is applied, the plate springs 67c, 67d are elastically deformed to be further elongated in the X-axis direction. As a result, the inner surface 66a of the first spacer part 61a and the inner surface 66b of the second spacer part 61b are contacted to each other. At this state, the plate springs 67c, 67d are completely accommodated in the plate spring accommodation spaces.

Also, the guide pin 63 is a guide pin for a multimode optical fiber, and is manufactured so that an error of an outer diameter of the guide pin at each position in an axis direction thereof as regards a predetermined design value is equal to or less than ±1.0 μm. The merits of the guide pin for a multimode optical fiber will be described later.

Next, states before and after the first ferrule 40 of the first optical connector 10 and the second ferrule 140 of the second optical connector 100 are positioned with respect to each other are described with reference to FIGS. 7 and 8. FIG. 7 is a sectional view of the optical connector coupling system 1 in a direction perpendicular to the Y-axis direction, and depicts a state (simply referred to as a first state) before the first optical connector 40 and the second ferrule 140 are positioned through the spacer 60. FIG. 8 is a sectional view of the optical connector coupling system 1 in a direction perpendicular to the Y-axis direction, and depicts a state (a second state) after the first optical connector 40 and the second ferrule 140 are positioned with respect to each other through the spacer 60.

Figure 7:
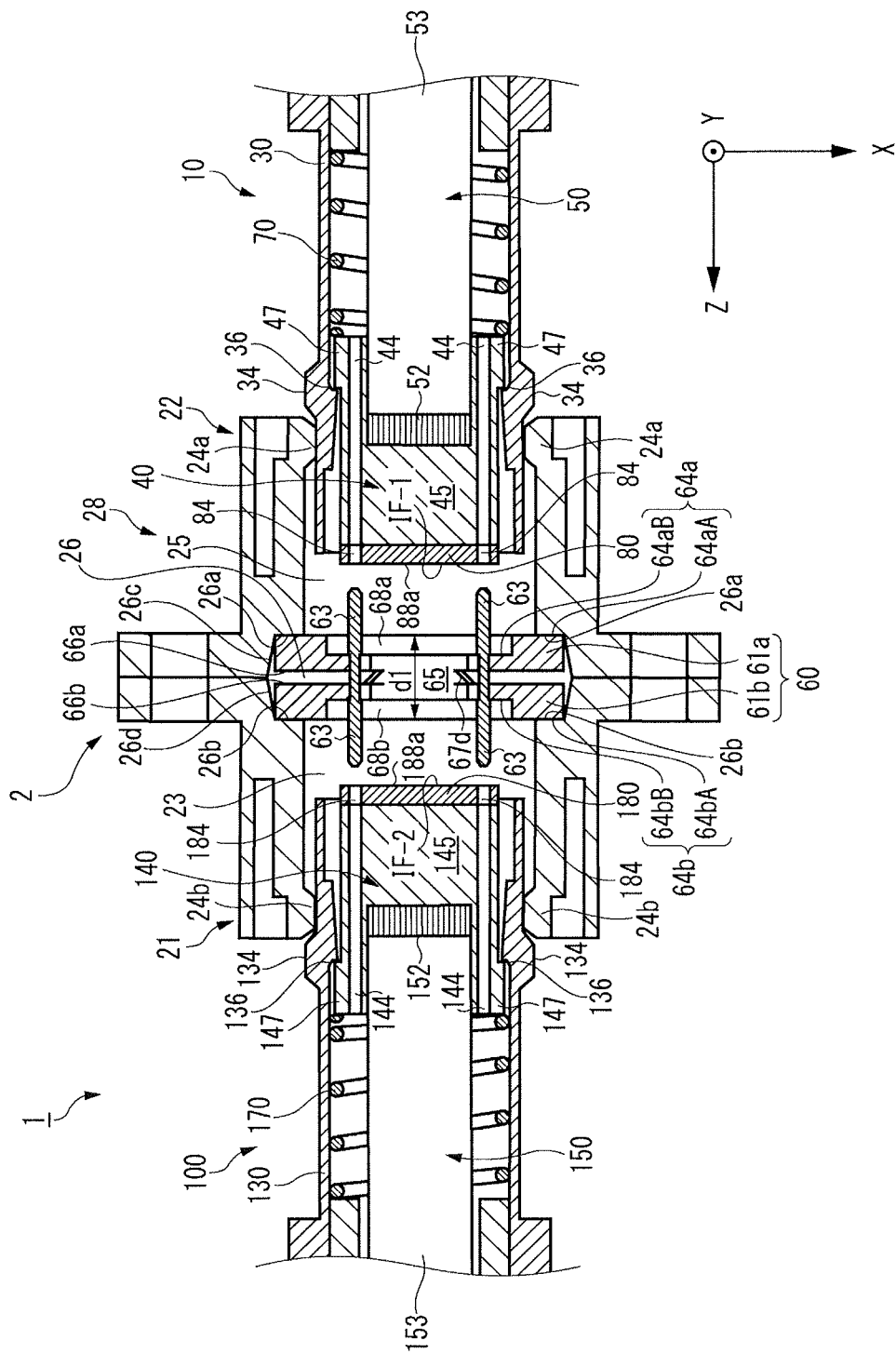
FIG. 7 is a sectional view of the optical connector coupling system, which depicts a state (a first state) before the first optical connector and a second optical connector are positioned with respect to each other through the spacer.
Figure 8:
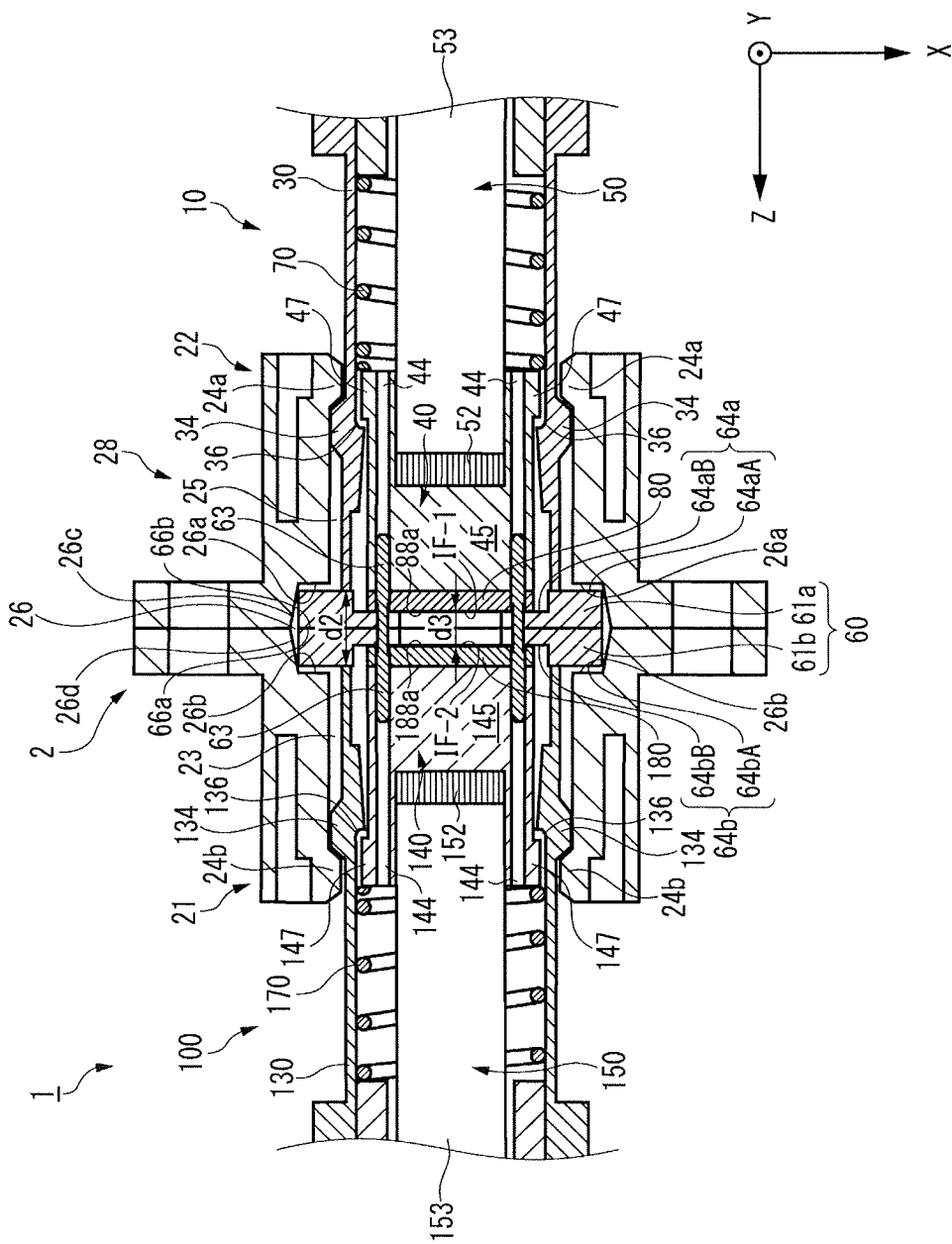
FIG. 8 is a sectional view of the optical connector coupling system, which depicts a state (a second state) after the first optical connector and the second optical connector are positioned with respect to each other through the spacer.

As shown in FIG. 7, when the first optical connector accommodation part 21 and the second optical connector accommodation part 22 are coupled to each other, a third cavity 26 is formed. That is, the optical connector accommodation part 28 further has the third cavity 26 between the first cavity 25 and the second cavity 23.

As shown in FIGS. 5 and 7, the third cavity 26 has a first inner wall surface 26a, a second inner wall surface 26b, a third inner wall surface 26c, a fourth inner wall surface 26d, a fifth inner wall surface 26e, and a sixth inner wall surface 26f. The third inner wall surface 26c and the fifth inner wall surface 26e are inclined relative to the first inner wall surface 26a, and continue from the first inner wall surface 26a. The fourth inner wall surface 26d and the sixth inner wall surface 26f are inclined relative to the second inner wall surface 26b, and continue from the second inner wall surface 26b. The third inner wall surface 26c and the fourth inner wall surface 26d intersect at a boundary part between the first optical connector accommodation part 21 and the second optical connector accommodation part 22. A width of the third cavity 26 in the X-axis direction is set to be greater as the third cavity is closer to the boundary part between the first optical connector accommodation part 21 and the second optical connector accommodation part 22 in the Z-axis direction. The third cavity 26 has the same shape in a YZ plane, too, and a width of the third cavity 26 in the Y-axis direction is set to be greater as the third cavity is closer to the boundary part in the Z-axis direction.

The spacer 60 is accommodated in the third cavity 26. The outermost surface 64aA of the first spacer part 61a faces the first inner wall surface 26a. In the meantime, the outermost surface 64bA of the second spacer part 61b faces the second inner wall surface 26b.

In the optical connector coupling system 1 shown in FIG. 7, the first optical connector 10 is accommodated in the first cavity 25. The second optical connector 100 is accommodated in the second cavity 23. The first optical connector 10 and the second optical connector 100 face each other through the spacer 60. The second optical connector 100 has the same configuration as the first optical connector 10.

Like the first optical connector 10, the second optical connector 100 has a second ferrule 140, a second housing 130, and a spring 170 (second elastic member). The second ferrule 140 has a second main body part 145 and a second lens array 180. The second housing 130 is configured to accommodate therein the second ferrule 140 and the spring 170.

The optical cable 150 has a plurality of second optical fibers 152 arranged in parallel in the X-axis direction and a covering 153 configured to integrally cover the plurality of second optical fibers 152. The second ferrule 140 has a second main body part 145 having optical fiber holding holes (not shown) configured to hold end portions of the second optical fibers 152. The second main body part 145 has a pair of guide pin insertion holes 144 at a front end thereof. The second lens array 180 has a second optical interface part IF-2 (refer to FIG. 9) arranged on the second main body part 145 in the Z-axis direction and configured to expand and emit the light beams emitted from the second optical fibers 152, and a pair of guide holes 184 (second guide part). The second optical interface part IF-2 has GRIN lenses 182 (refer to FIG. 9). The respective guide holes 184 are formed to penetrate the second lens array 180 in the Z-axis direction, are positioned with respect to the corresponding guide pin insertion holes 144 and are configured to communicate with the same.

At the first state, the position of the spacer 60 in the third cavity 26 is restrained in the X-axis direction, in the Y-axis direction and in the Z-axis direction. As shown in FIG. 7, the outermost surface 64aA of the first spacer part 61a and the outermost surface 64bA of the second spacer part 61b are respectively contacted to the first inner wall surface 26a and second inner wall surface 26b defining the third cavity 26, so that the positions thereof in the Z-axis direction are restrained. Also, the first spacer part 61a and the second spacer part 61b are restrained as regards the positions thereof in the X-axis direction by the third inner wall surface 26c and the fourth inner wall surface 26d and are restrained as regards the positions thereof in the Y-axis direction by the fifth inner wall surface 26e and the sixth inner wall surface 26f.

A distance (specifically, a distance between the outermost surface 64aA and the outermost surface 64bA) between the outer surface 64a and the outer surface 64b of the spacer 60 in the Z-axis direction is denoted with d1. Also, at the first state, the first spacer part 61a and the second spacer part 61b are spaced from each other through the plate springs 67c, 67d.

The first optical connector 10 is moved in the +Z direction and the second optical connector 100 is moved in the −Z direction from the state shown in FIG. 7, so that the corresponding guide pins 63 are inserted into the pair of guide holes 84 and guide pin insertion holes 44 of the first optical connector 10, and into the pair of guide holes 184 and guide pin insertion holes 144 of the second optical connector 100. Also, when the first optical connector 10 is moved in the +Z direction, the front surface 88a of the first lens array 80 is contacted to the bottom surface 64aB of the first spacer part 61a. Likewise, when the second optical connector 100 is moved in the −Z direction, the front surface 188a of the second lens array 180 is contacted to the bottom surface 64bB of the second spacer part 61b.

In this way, as shown in FIG. 8, at the state where the first lens array 80 is contacted to the bottom surface 64aB of the first spacer part 61a and the second lens array 180 is contacted to the bottom surface 64bB of the second spacer part 61b, the first optical interface part IF-1 and the second optical interface part IF-2 are arranged to face each other at a predetermined interval. The predetermined interval is a distance d3 between the bottom surface 64aB of the first spacer part 61a and the bottom surface 64bB of the second spacer part 61b in the Z-axis direction, for example.

At this state, the first optical connector 10 and the second optical connector 100 are positioned with respect to each other through the guide pins 63 of the spacer 60. Also, the first optical fibers 52 are optically coupled to the second optical fibers 152 through the first optical interface part IF-1, the opening 65 of the spacer 60 and the second optical interface part IF-2. Here, the opening 65 of the spacer 60 is configured to enable the light beams, which propagate between the first optical interface part IF-1 and the second optical interface part IF-2, to pass therethrough.

Also, at the second state, the outermost surface 64aA of the first spacer part 61a and the outermost surface 64bA of the second spacer part 61b are respectively spaced from the first inner wall surface 26a and second inner wall surface 26b defining the third cavity 26. A distance d2 (specifically, a distance between the outermost surface 64aA and the outermost surface 64bA) between the outer surface 64a and the outer surface 64b of the spacer 60 in the Z-axis direction is smaller than the distance d1. Also, a width of the third cavity 26 in the X-axis direction and in the Y-axis direction is set to be greater as the third cavity is closer to the boundary part between the first optical connector accommodation part 21 and the second optical connector accommodation part 22 in the Z-axis direction. Therefore, the first spacer part 61a and the second spacer part 61b are arranged to have clearances from the third inner wall surface 26c and the fourth inner wall surface 26d in the X-axis direction and are also arranged to have clearances from the fifth inner wall surface 26e and the sixth inner wall surface 26f in the Y-axis direction. Also, the inner surface 66a of the first spacer part 61a and the inner surface 66b of the second spacer part 61b are contacted to each other.

In this way, it is possible to appropriately set the distance d3 by the thicknesses of the spacer parts 61a, 61b and the depths of the recess portions 68a, 68b.

Also, at the second state, an engaging part 34 of the first housing 30 is engaged with a first engaging part 24a of the adapter 2, and an engaging part 134 of the second housing 130 is engaged with a second engaging part 24b of the adapter 2. In this way, the first optical connector 10 and the second optical connector 100 are engaged with the adapter 2.

Also, at the second state, the spring 70 of the first optical connector 10 presses the first ferrule 40 so that the first lens array 80 is contacted to the outer surface 64a (specifically, the bottom surface 64aB) of the spacer 60. Likewise, the spring 170 of the second optical connector 100 presses the second ferrule 140 so that the second lens array 180 is contacted to the outer surface 64b (specifically, the bottom surface 64bB) of the spacer 60.

(Operational Effects of Adapter 2 and Optical Connector Coupling System 1 of Exemplary Embodiment)

Next, operational effects of the adapter 2 and the optical connector coupling system 1 according to the exemplary embodiment are described.

According to the adapter 2 of the exemplary embodiment, the first lens array 80 is contacted to the outer surface 64a (first surface) of the spacer 60, and the second lens array 180 is contacted to the outer surface 64b (second surface) of the spacer 60. Thereby, it is possible to optically couple the first optical connector 10 and the second optical connector 100 with the first optical interface part IF-1 and the second optical interface part IF-2 being arranged to face each other at the predetermined interval (the distance d3, in this exemplary embodiment).

Thereby, it is possible to make the first optical interface part IF-1 and the second optical interface part IF-2 face each other at the predetermined interval, irrespective of the formation positions of the first optical interface part IF-1 and the second optical interface part IF-2. For example, even when the first optical interface part IF-1 and the second optical interface part IF-2 are flush with the front surface 88a and the front surface 188a, which are the end surfaces of the first optical connector 10 and the second optical connector 100, like this exemplary embodiment, it is possible to make the first optical interface part IF-1 and the second optical interface part IF-2 face each other at the predetermined interval. Therefore, it is possible to provide the adapter 2 capable of increasing the degree of design freedom of the optical connector.

Also, according to the optical connector coupling system 1 shown in FIGS. 7 and 8, the first lens array 80 protrudes from the first housing 30 in the insertion direction (+Z direction) in which the first optical connector 10 is inserted into the adapter 2. Also, the second lens array 180 protrudes from the second housing 130 in the insertion direction (−Z direction) in which the second optical connector 100 is inserted into the adapter 2. For this reason, it is possible to securely bring the first lens array 80 and the second lens array 180 into contact with the outer surfaces 64*a*, 64*b* of the spacer 60, respectively.

Also, at the first state shown in FIG. 7, the first spacer part 61*a* is contacted to the first inner wall surface 26*a*, third inner wall surface 26*c* and fifth inner wall surface 26*e* of the third cavity 26. Also, the second spacer part 61*b* is contacted to the second inner wall surface 26*b*, fourth inner wall surface 26*d* and sixth inner wall surface 26*f* of the third cavity 26. Thereby, it is possible to restrain the accommodation positions of the spacer 60 in the X-axis direction, the Y-axis direction and the Z-axis direction.

In the meantime, at the second state shown in FIG. 8, the first spacer part 61*a* is arranged to have the clearances from the first inner wall surface 26*a*, third inner wall surface 26*c* and fifth inner wall surface 26*e* of the third cavity 26. Also, the second spacer part 61*b* is arranged to have the clearances from the second inner wall surface 26*b*, fourth inner wall surface 26*d* and sixth inner wall surface 26*f* of the third cavity 26. Thereby, the spacer 60 can move relative to the adapter 2 in the XYZ-axis directions (hereinafter, also referred to as a floating state).

For this reason, when the external force is applied to the adapter 2, the external force is difficult to be transmitted to the spacer 60. Thereby, the external force is difficult to have an adverse influence on the optical coupling between the optical connectors 10, 100. Therefore, it is possible to provide the adapter 2 of which reliability against the external force is improved.

Also, the distance between the outermost surface 64*a*A and the outermost surface 64*b*A of the spacer 60 is the distance d1 at the first state but is the distance d2 smaller than the distance d1 at the second state. Also, the width of the third cavity 26 in the X-axis direction and the Y-axis direction is set to be greater as the third cavity is closer to the boundary part between the first optical connector accommodation part 21 and the second optical connector accommodation part 22 in the Z-axis direction. In this way, the distance between the outermost surface 64*a*A and the outermost surface 64*b*A of the spacer 60 is changed, so that it is possible to implement the state where the spacer 60 is contacted to or spaced from the third cavity 26.

Here, the spacer 60 has the plate springs 67*c*, 67*d* configured to elastically connect the first spacer part 61*a* and the second spacer part 61*b*. Thereby, it is possible to easily implement the state where the spacer 60 is contacted to or spaced from the third cavity 26.

Also, at the second state shown in FIG. 8, the elastic forces of the spring 70 and the spring 170 are higher than the elastic forces of the plate springs 67*c*, 67*d*. For this reason, since it is possible to bring the inner surface 66*a* of the first spacer part 61*a* and the inner surface 66*b* of the second spacer part 61*b* into contact with each other, it is possible to set the interval between the first optical connector 10 and the second optical connector 100 to the predetermined distance d3. In this way, it is possible to provide the optical connector coupling system 1 capable of securely optically coupling the first optical connector 10 and the second optical connector 100 arranged to face each other.

Also, at the first state shown in FIG. 7, the elastic force that is to be applied to the first ferrule 40 by the spring 70 and the elastic force that is to be applied to the second ferrule 140 by the spring 170 are set to be substantially the same. At this state, since the spring 70 presses the first ferrule 40 in the +Z direction but the rear end portion 47 of the first ferrule 40 is contacted to the inner wall surface 36 of the first housing 30, the first ferrule 40 is at a stationary state with being applied with the pressing force from the spring 70. Likewise, since the spring 170 presses the second ferrule 140 in the −Z direction but the rear end portion 147 of the second ferrule 140 is contacted to the inner wall surface 136 of the second housing 130, the second ferrule 140 is at a stationary state with being applied with the pressing force from the spring 170.

In the meantime, the elastic force that is to be applied to the first ferrule 40 by the spring 70 and the elastic force that is to be applied to the second ferrule 140 by the spring 170 are set to be substantially the same. Thereby, at the second state shown in FIG. 8, the first ferrule 40 is slightly retreated in the −Z direction, and the second ferrule 140 is slightly retreated in the +Z direction (this phenomenon is also referred to as 'ferrule back').

At this time, a central position of the spacer 60 in the Z-axis direction (a boundary surface between the first spacer part 61*a* and the second spacer part 61*b*) substantially coincides with the position of the third cavity 26 in the Z-axis direction. Since the first optical connector 10 and the second optical connector 100 are symmetrically arranged in the adapter 2, the coupling state is stably kept.

Also, when the first ferrule 40 is slightly retreated in the −Z direction, a slight clearance occurs in the Z-axis direction between the rear end portion 47 of the first ferrule 40 and the inner wall surface 36 of the first housing 30. Likewise, when the second ferrule 140 is slightly retreated in the +Z direction, a slight clearance occurs in the Z-axis direction between the rear end portion 147 of the second ferrule 140 and the inner wall surface 136 of the second housing 130. Thereby, at the second state, the first ferrule 40 is accommodated in the first housing 30 so that it can move relative to the first housing 30 in the XYZ-axis directions. In the meantime, the second ferrule 140 is accommodated in the second housing 130 so that it can move relative to the second housing 130 in the XYZ-axis directions. In this way, the first ferrule 40 and the second ferrule 140 is accommodated in the housing at the floating state. Also, as described above, the spacer 60 is accommodated in the adapter 2 at the floating state.

Therefore, even when the external force is applied to the adapter 2, the spacer 60, the first ferrule 40 and the second ferrule 140 are integrally moved. Therefore, the external force is difficult to have an adverse influence on the optical coupling between the first optical fiber 52 and the second optical fiber 152. Likewise, even when the external force is applied to the first housing 30 and the second housing 130, the external force is difficult to have an adverse influence on the optical coupling between the first optical fiber 52 and the second optical fiber 152. Therefore, it is possible to provide the adapter 2 of which reliability against the external force is improved.

Also, according to the optical connector coupling system 1 of the exemplary embodiment, the spacer 60 is provided with the pair of guide pins 63. Thereby, since the first optical connector 10 and the second optical connector 100 can be made as the female optical connectors, it is possible to save the manufacturing cost. Also, since it is not necessary to provide the guide pin for the optical connector, it is possible to easily clean the front end portion of the optical connector.

(Optical Coupling Between First Optical Fiber 52 and Second Optical Fiber 152)

Figure 9:
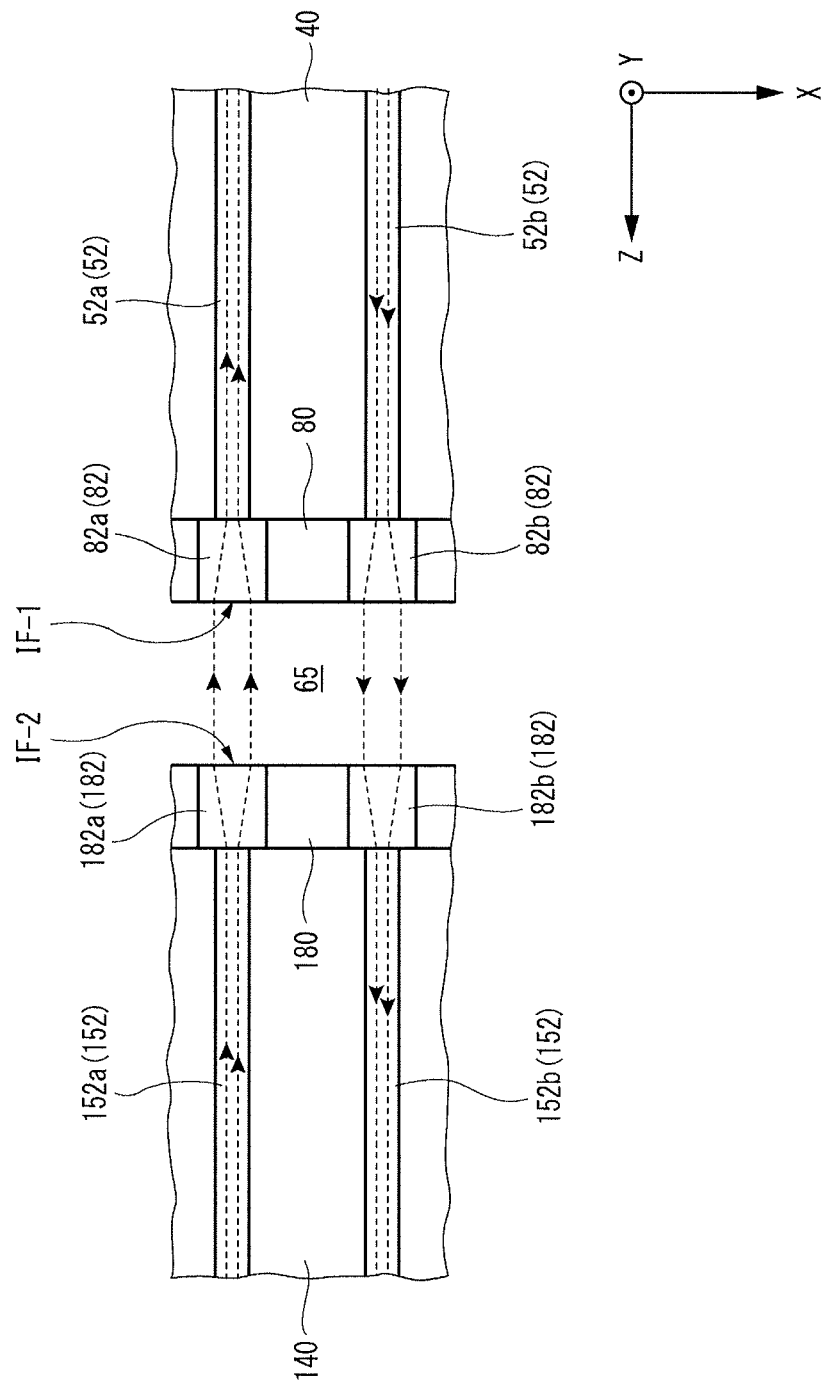
FIG. 9 is a pictorial view for illustrating an optical coupling between the first optical fiber and the second optical fiber shown in FIG. 8.

Next, the optical coupling between the first optical fiber 52 and the second optical fiber 152 is described with reference to FIG. 9. FIG. 9 is a pictorial view for illustrating the optical coupling between the first optical fiber 52 and the second optical fiber 152.

In the meantime, among the plurality of first optical fibers 52 held at the first ferrule 40, a reception-side optical fiber is referred to as a first optical fiber 52a and a transmission-side optical fiber is referred to as a first optical fiber 52b. Likewise, among the plurality of second optical fibers 152 held at the second ferrule 140, a transmission-side optical fiber is referred to as a second optical fiber 152a and a reception-side optical fiber is referred to as a second optical fiber 152b. Both the first optical fiber 52 and the second optical fiber 152 are single mode optical fibers.

Also, the first lens array 80 has the plurality of GRIN lenses 82, and configures the first optical interface part IF-1. The plurality of GRIN lenses 82 includes a GRIN lens 82a optically coupled with the first optical fiber 52a and a GRIN lens 82b optically coupled with the first optical fiber 52b.

Likewise, the second lens array 180 has the plurality of GRIN lenses 182, and configures the second optical interface part IF-2. The plurality of GRIN lenses 182 includes a GRIN lens 182a optically coupled with the second optical fiber 152a and a GRIN lens 182b optically coupled with the second optical fiber 152b.

The light beams propagating in the first optical fibers 52b in the +Z direction and incident to the GRIN lenses 82b are expanded by the GRIN lenses 82b and are emitted from the first optical interface part IF-1 towards the opening 62. The GRIN lenses 82b are configured to collimate the diverging lights emitted from the first optical fibers 52b and to convert the same into the substantially parallel lights in the +Z direction.

The light beams emitted from the first optical interface part IF-1 propagate in the opening 62 in the +Z direction and are incident to the second optical interface part IF-2. Then, the light beams are condensed on the end surfaces of the second optical fibers 152b by the GRIN lenses 182b, and propagate in the second optical fibers 152b in the +Z direction. In this way, the first optical fibers 52b and the second optical fibers 152b are optically coupled to each other through the first optical interface part IF-1 and the second optical interface part IF-2.

Likewise, the second optical fibers 152a and the first optical fibers 52a are also optically coupled to each other through the first optical interface part IF-1 and the second optical interface part IF-2.

According to the optical connector coupling system 1 of the exemplary embodiment, the light beams are expanded between the first optical interface part IF-1 and the second optical interface part IF-2. Thereby, it is possible to suppress the connection loss, which is caused due to the axis deviation between the first optical connector 10 and the second optical connector 100 in the plane (XY plane) orthogonal to the optical coupling direction (Z-axis direction). Therefore, it is possible to provide the optical coupling structure in which the lowering of the optical characteristics due to the axis deviation is suppressed (the tolerance is high).

Thereby, since the high size precision is not required for the guide pins configured to position the first optical connector 10 and the second optical connector 100, it is possible to provide the optical connector coupling system 1 having good optical characteristics at low cost. In an example of the exemplary embodiment, as the first guide pin 64 and the second guide pin 68, a guide pin for a multimode optical fiber can be applied. The guide pin for a multimode optical fiber is a guide pin that is normally used for an optical connector configured to optically couple multimode optical fibers, and a difference between the diameter of the first guide pin 64 and the inner diameters of the pair of guide holes 184 and a difference between the diameter of the second guide pin 68 and the inner diameters of the pair of guide holes 84 are equal to or less than 2 μm, for example.

In general, the single mode optical fibers are optically coupled using the guide pins for a single mode optical fiber. In this case, a difference between the diameter of the guide pin and the inner diameter of the guide hole is equal to or less than 1 μm. In the meantime, according to the optical connector coupling system 1 of the exemplary embodiment, even when the difference between the diameter of the first guide pin 64 and the inner diameters of the pair of guide holes 184 and the difference between the diameter of the second guide pin 68 and the inner diameters of the pair of guide holes 84 are greater than 1 μm and equal to or less than 2 μm, the lowering of the optical characteristics between the second optical fiber 152a and the first optical fiber 52a is small. In this way, it is possible to save the manufacturing cost of the optical connector coupling system 1 by using the guide pins for a multimode optical fiber to optically couple the single mode optical fibers.

(First Modified Example)

Figure 10:
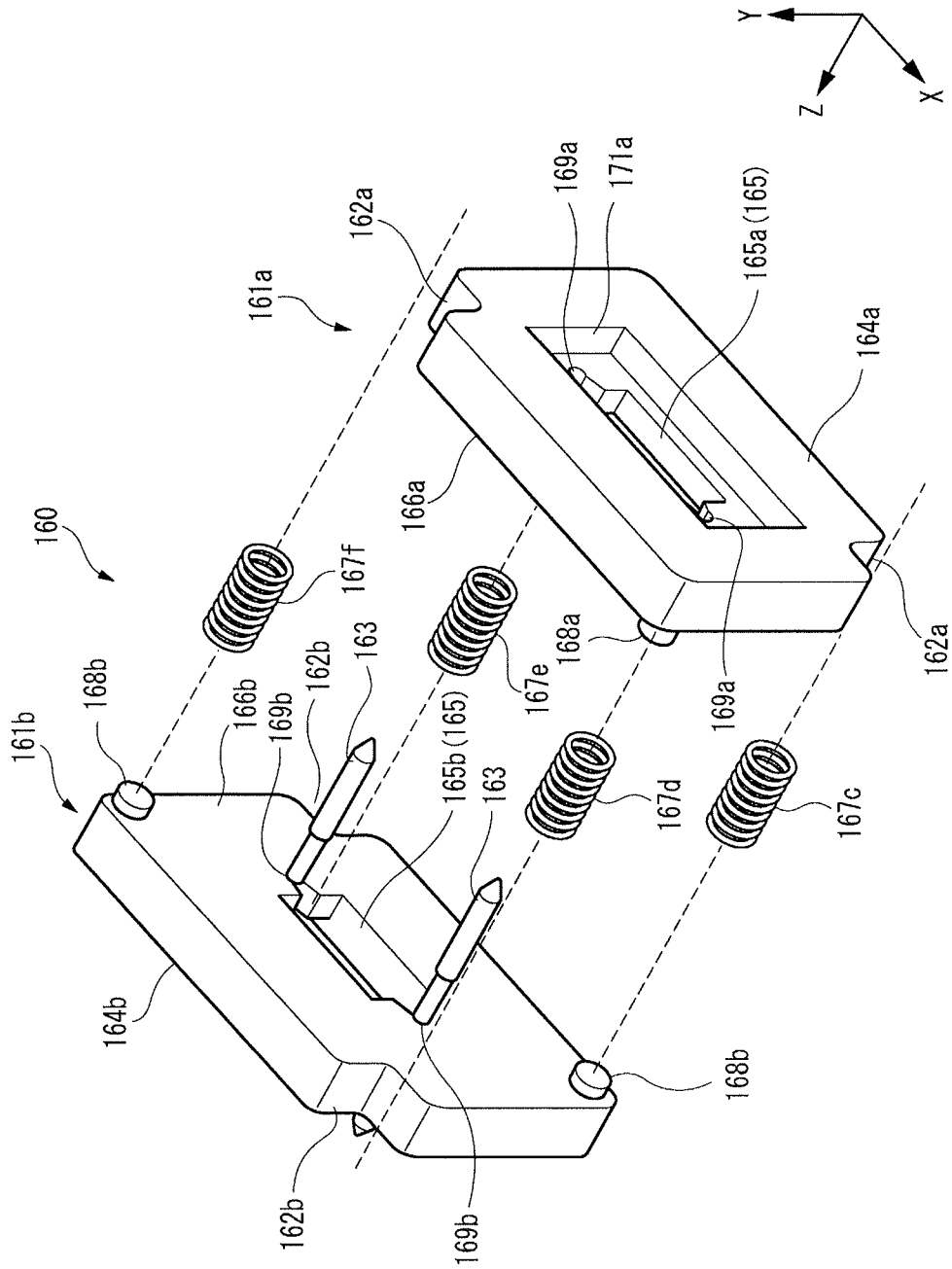
FIG. 10 is an exploded perspective view of a spacer of an adapter according to a first modified example of the first exemplary embodiment.

Next, a first modified example of the adapter 2 of the first exemplary embodiment is described with reference to FIGS. 10 and 11. FIG. 10 is an exploded perspective view of a spacer 160 of an adapter 2A according to the first modified example. FIGS. 11A and 11B are sectional views depicting the adapter 2A of the first modified example. FIG. 11A is a sectional view depicting the adapter 2A at a state (hereinafter, simply referred to as a first state) before the first optical connector 10 and the second optical connector 100 are positioned with respect to each other through the spacer 160. FIG. 11B is a sectional view depicting the adapter 2A at a state (hereinafter, simply referred to as a second state) after the first optical connector 10 and the second optical connector 100 are positioned with respect to each other through the spacer 160.

In the meantime, since the members having the same reference numerals as the members described in the first exemplary embodiment have the same configurations, the descriptions thereof are omitted.

A configuration of the spacer 160 shown in FIG. 10 is largely different from the spacer 60 shown in FIG. 6, in that helical springs 167c to 167f (elastic members) are used instead of the plate springs 67c, 67d used in the first exemplary embodiment. The spacer 160 has a first spacer part 161a, a second spacer part 161b, a pair of guide pins 163 and helical springs 167c to 167f. Also, the spacer 160 has an opening 165 (light transmission part) extending in the Z-axis direction. The first spacer part 161a and the second spacer part 161b have the same configuration. The first spacer part 161a has an outer surface 164a (a first surface of the spacer 160), an inner surface 166a, a recess portion 171a, an opening 165a, spring fixing parts 168a, and spring insertion parts 162a.

The inner surface 166a is positioned at an opposite side to the outer surface 164a. The recess portion 171a having a substantially cuboid shape is formed at the outer surface 164a of the first spacer part 161a, and is configured to communicate with the opening 165a. Both ends of the opening 165a in the X-axis direction are formed with guide pin holding holes 169a for holding the guide pins 163, and the respective guide pin holding holes 169a are configured to communicate with the opening 165a. The opening 165a configures a part of the opening 165 of the spacer 160. The two spring fixing parts 168a and the two spring insertion parts 162a are respectively arranged at four corners of the first spacer part 161a.

The second spacer part 161b has an outer surface 164b (a second surface of the spacer 160), an inner surface 166b, a recess portion (not shown), an opening 165b, spring fixing parts 168b, and spring insertion parts 162b.

The inner surface 166b is positioned at an opposite side to the outer surface 164b and faces the inner surface 166a of the first spacer part 161a. The outer surface 164b of the second spacer part 161b is formed with the recess portion having the same shape as the recess portion 171a and configured to communicate with the opening 165b. Both ends of the opening 165b in the X-axis direction are formed with guide pin holding holes 169b for holding the guide pins 163, and the respective guide pin holding holes 169b are configured to communicate with the opening 165b. The opening 165b configures a part of the opening 165 of the spacer 160. The two spring fixing parts 168b and the two spring insertion parts 162b are respectively arranged at four corners of the second spacer part 161b.

The helical spring 167c faces the spring fixing part 168b and the spring insertion part 162a. The helical spring 167d faces the spring insertion part 162b and the spring fixing part 168a. The helical spring 167e faces the spring insertion part 162b and the spring fixing part 168a (not shown). The helical spring 167f faces the spring fixing part 168b and the spring insertion part 162a.

Next, the adapter 2A having the spacer 160 is described with reference to FIGS. 11A and 11B. The adapter 2A has the spacer 160 and an optical connector accommodation part 28A. In the sectional view of the adapter 2A shown in FIGS. 11A and 11B, the adapter 2A is cut away in the direction orthogonal to the Y-axis direction, as shown with the cutting surfaces of the helical springs 167d, 167f. The optical connector accommodation part 28A has the substantially same configuration as the optical connector accommodation part 28 described in the first exemplary embodiment, except that a plurality of spring accommodation parts 127c to 127f is provided.

The optical connector accommodation part 28A has a first cavity 125 in which the first optical connector 10 (refer to FIG. 7) is to be accommodated, a second cavity 123 in which the second optical connector 100 (refer to FIG. 7) is to be accommodated, and a third cavity 126 formed between the first cavity 125 and the second cavity 123. The third cavity 126 has a spacer accommodation part 128 configured to accommodate therein the spacer 160, and a plurality of spring accommodation part 127c to 127f. The spacer 160 is accommodated in the spacer accommodation part 128. The spacer accommodation part 128 has an inner wall surface 128a facing the outer surface 164a of the first spacer part 161a and an inner wall surface 128b facing the outer surface 164b of the second spacer part 161b. The respective spring accommodation parts 127c to 127f are configured to communicate with the spacer accommodation part 128.

The third cavity 126 has a first inner wall surface 126a, a second inner wall surface 126b, a third inner wall surface 126c, a fourth inner wall surface 126d, a fifth inner wall surface (not shown), and a sixth inner wall surface (not shown). The first inner wall surface 126a faces the outer surface 164a of the first spacer part 161a. The second inner wall surface 126b faces the outer surface 164b of the second spacer part 161b. Here, the first inner wall surface 126a includes the inner wall surface 128a of the spacer accommodation part 128, a bottom surface 127ca of the spring accommodation part 127c, and a bottom surface 127fa of the spring accommodation part 127f. Also, the second inner wall surface 126b includes the inner wall surface 128b of the spacer accommodation part 128, a bottom surface 127db of the spring accommodation part 127d, and a bottom surface 127eb of the spring accommodation part 127e. Since the configurations and functions of the third inner wall surface 126c, the fourth inner wall surface 126d, the fifth inner wall surface and the sixth inner wall surface are the same as the third inner wall surface to the sixth inner wall surface of the first exemplary embodiment, the descriptions thereof are here omitted.

The helical spring 167c is accommodated in the spring accommodation part 127c. The helical spring 167c is fixed to the spring fixing part 168b of the second spacer part 161b, and is contacted to the bottom surface 127ca of the spring accommodation part 127c through the spring insertion part 162a of the first spacer part 161a. In this way, the helical spring 167c elastically connects the second spacer part 161b and the bottom surface 127ca.

The helical spring 167d is accommodated in the spring accommodation part 127d. The helical spring 167d is fixed to the spring fixing part 168a of the first spacer part 161a, and is contacted to the bottom surface 127db of the spring accommodation part 127d through the spring insertion part 162b of the first spacer part 161b. In this way, the helical spring 167d elastically connects the first spacer part 161a and the bottom surface 127db.

The helical spring We is accommodated in the spring accommodation part 127e. The helical spring 167e is fixed to the spring fixing part of the first spacer part 161a, and is contacted to the bottom surface 127eb of the spring accommodation part 127e through the spring insertion part 162b of the first spacer part 161b. In this way, the helical spring 167e elastically connects the first spacer part 161a and the bottom surface 127eb.

The helical spring 167f is accommodated in the spring accommodation part 127f. The helical spring 167f is fixed to the spring fixing part 168b of the second spacer part 161b, and is contacted to the bottom surface 127fa of the spring accommodation part 127f through the spring insertion part 162a of the first spacer part 161a. In this way, the helical spring 167f elastically connects the first spacer part 161b and the bottom surface 127fa.

As shown in FIG. 11A, at the first state (refer to FIG. 7 as regards the states of the first optical connector 10 and the second optical connector 100), the outer surface 164a of the first spacer part 161a and the outer surface 164b of the second spacer part 161b are contacted to the inner wall surface 128a and inner wall surface 128b of the spacer accommodation part 128, respectively. At the first state, a distance between the outer surface 164a and outer surface 164b of the spacer 160 in the Z-axis direction is a distance d4.

On the other hand, as shown in FIG. 11B, at the second state (refer to FIG. 8 as regards the states of the first optical connector 10 and the second optical connector 100), the outer surface 164a of the first spacer part 161a and the outer surface 164b of the second spacer part 161b are respectively spaced from the inner wall surface 128a and inner wall surface 128b of the spacer accommodation part 128. At the second state, the distance between the outer surface 164a and outer surface 164b of the spacer 160 in the Z-axis direction is a distance d5 smaller than the distance d4. Also, at the second state, the inner surface 166a of the first spacer part 161a and the inner surface 166b of the second spacer part 161b are contacted to each other.

(Operational Effects of Adapter 2A of First Modified Example)

The adapter 2A of the first modified example can accomplish the same operational effects of the adapter 2 of the first exemplary embodiment.

Also, according to the helical springs 167c to 167f, it is possible to prevent the spacer 160 from performing an unintended operation. In particular, since the helical springs 167c to 167f can restrain the bending of the spacer 160 in the XY plane to some extent, the spacer 160 is prevented from performing the unintended operation in the XY plane. Thereby, it is possible to prevent the accommodation position of the spacer 160 from deviating, which is caused when inserting and pulling out the first optical connector 10 and the second optical connector 100 to and from the adapter. Therefore, it is possible to provide the adapter 2A that can be easily handled.

(Second Modified Example)

Next, a second modified example of the adapter 2 of the first exemplary embodiment is described with reference to FIGS. 12A and 12B. FIGS. 12A and 12B are sectional views depicting an adapter 2B of the second modified example. FIG. 12A is a sectional view depicting the adapter 2B at a state (first state) before the first optical connector 10 and the second optical connector 100 are positioned with respect to each other through a spacer 260. FIG. 12B is a sectional view depicting the adapter 2B at a state (second state) after the first optical connector 10 and the second optical connector 100 are positioned with respect to each other through the spacer 260. In the meantime, since the members having the same reference numerals as the members described in the first exemplary embodiment have the same configurations, the descriptions thereof are omitted.

The adapter 2B shown in FIGS. 12A and 12B is different from the adapter 2 of the first exemplary embodiment, in that the spacer 260 is used instead of the spacer 60. The spacer 260 has a first spacer part 261a, a second spacer part 261b, and an elastic member 267 (the spacer elastic member), which are integrally configured. The spacer 260 has a pair of guide pins 263 and an opening 265 (light transmission part) extending in the Z-axis direction.

The first spacer part 261a and the second spacer part 261b have the same configuration. The first spacer part 261a has an outer surface 264a (a first surface of the spacer 260), an opening 265a forming a part of the opening 265, and guide pin insertion holes. The second spacer part 261b has an outer surface 264b (a second surface of the spacer 260), an opening 265b forming a part of the opening 265, and guide pin insertion holes. The elastic member 267 is configured to couple the first spacer part 261a and the second spacer part 261b.

As shown in FIG. 12A, at the first state (refer to FIG. 7 as regards the first optical connector 10 and the second optical connector 100), the outer surface 264a of the first spacer part 261a and the outer surface 264b of the second spacer part 261b are respectively contacted to the first inner wall surface 26a and second inner wall surface 26b of the third cavity 26. At the first state, a distance between the outer surface 264a and outer surface 264b of the spacer 260 in the Z-axis direction is a distance d6.

On the other hand, as shown in FIG. 12B, at the second state (refer to FIG. 8 as regards the first optical connector 10 and the second optical connector 100), the outer surface 264a of the first spacer part 261a and the outer surface 264b of the second spacer part 261b are respectively spaced from the inner wall surfaces 26a, 26b of the third cavity 26. At the second state, a distance between the outer surface 264a and outer surface 264b of the spacer 260 in the Z-axis direction is a distance d7 smaller than the distance d6.

(Operational Effects of Adapter 2B of Second Modified Example)

The adapter 2B of the second modified example can also accomplish the same operational effects as the adapter 2 of the first exemplary embodiment. According to the adapter 2B of this modified example, since the spacer 260 is integrally configured, it is possible to reduce the number of components.

(Third Modified Example)

Figure 13:
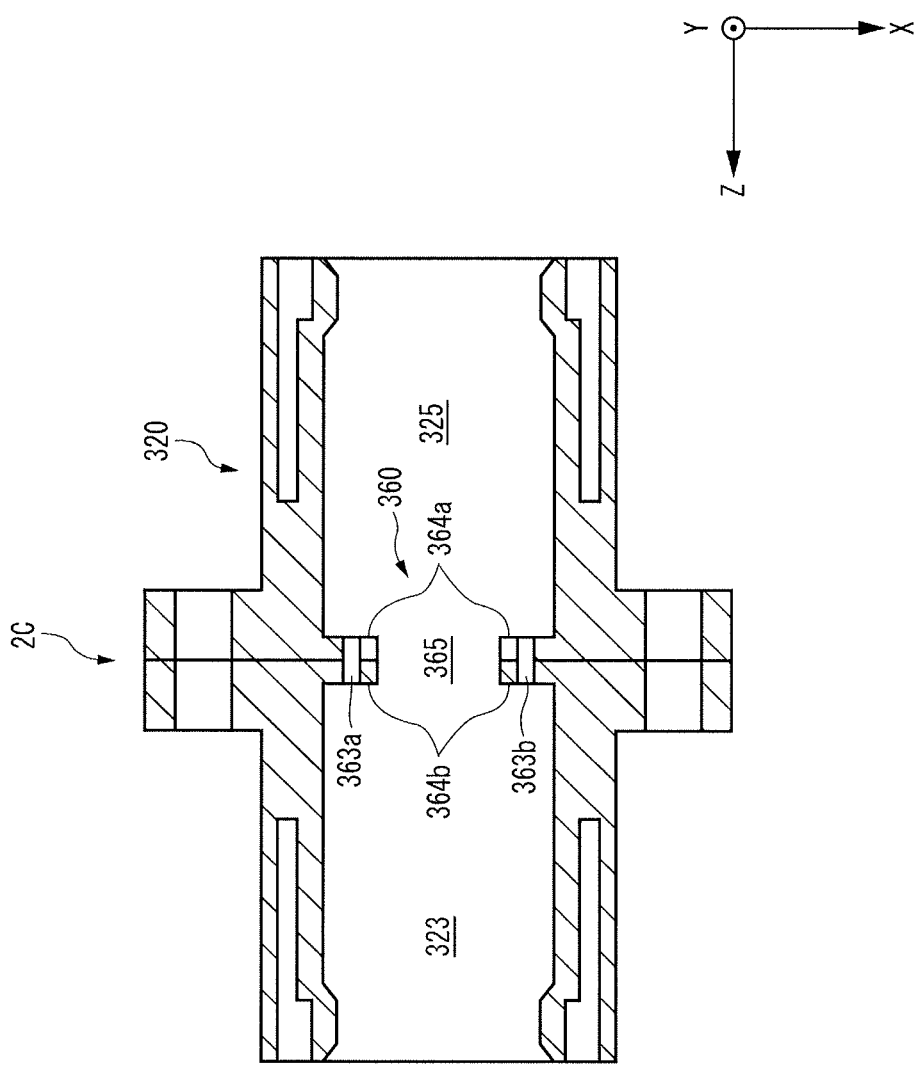
FIG. 13 is a sectional view depicting an adapter according to a third modified example of the first modified example.

Next, a third modified example of the adapter 2 of the first exemplary embodiment is described with reference to FIGS. 13 to 15. FIG. 13 is a sectional view depicting an adapter 2C according to the third modified example. In the meantime, since the members having the same reference numerals as the members described in the first exemplary embodiment have the same configurations, the descriptions thereof are omitted.

The adapter 2C shown in FIG. 13 is different from the adapter 2 of the first exemplary embodiment, in that a spacer 360 is used instead of the spacer 60. The adapter 2C has an optical connector accommodation part 320, and a spacer 360 integrally formed with the optical connector accommodation part 320.

The optical connector accommodation part 320 has a first cavity 325 and a second cavity 323. The spacer 360 is arranged between the first cavity 325 and the second cavity 323, and is integrally formed with the optical connector accommodation part 320. The spacer 360 has an opening 365 (light transmission part) extending in the Z-axis direction, an outer surface 364a (first surface), an outer surface 364b (second surface) positioned at an opposite to the outer surface 364a, and a pair of guide pin insertion holes 363a, 363b.

Subsequently, the first optical connector and the second optical connector, which are to be accommodated in the adapter 2C of the third modified example, are described with reference to FIGS. 14 and 15. FIG. 14 is a perspective view depicting a first ferrule 240 of the first optical connector, which is to be accommodated in the adapter 2C of the third modified example, and the vicinity thereof. The first optical connector has the substantially same structure as the first optical connector 10 of the first exemplary embodiment, except for the first ferrule 240. Also, the second optical connector, which is to be accommodated in the adapter 2C, has the same structure as the first optical connector and. Therefore, in the below, the first ferrule 240 is described.

Figure 14:
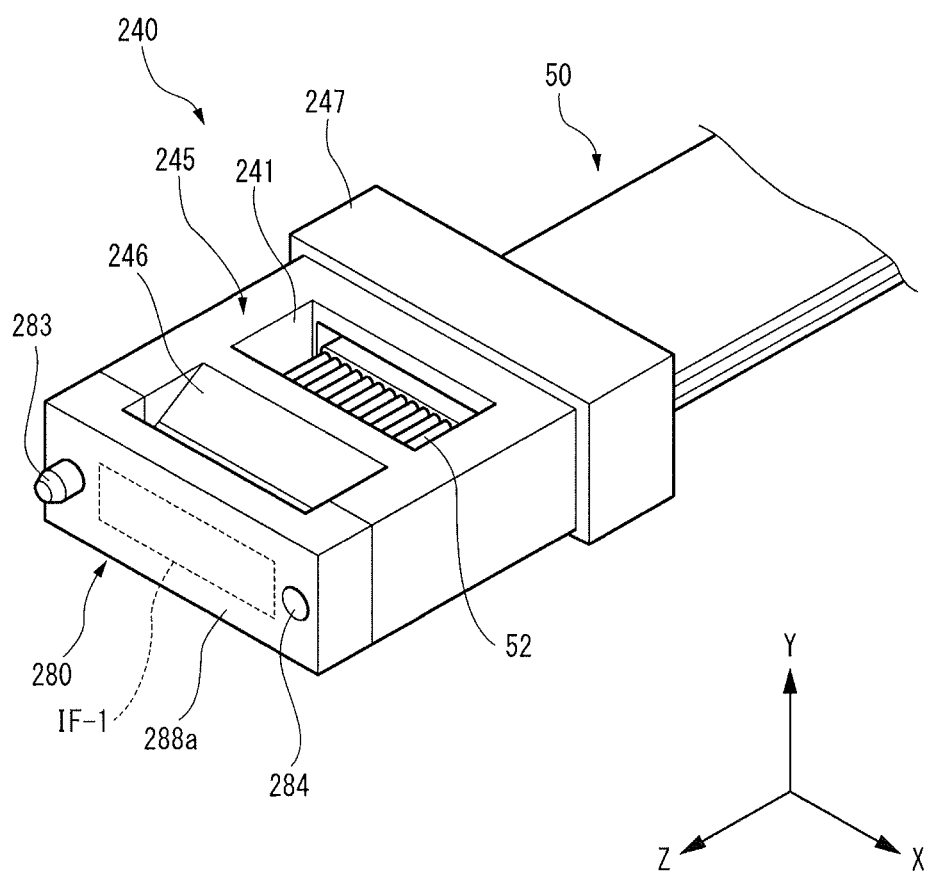
FIG. 14 is a perspective view depicting the first ferrule of the first optical connector, which is to be accommodated in the adapter of the third modified example, and the vicinity thereof.
Figure 15:
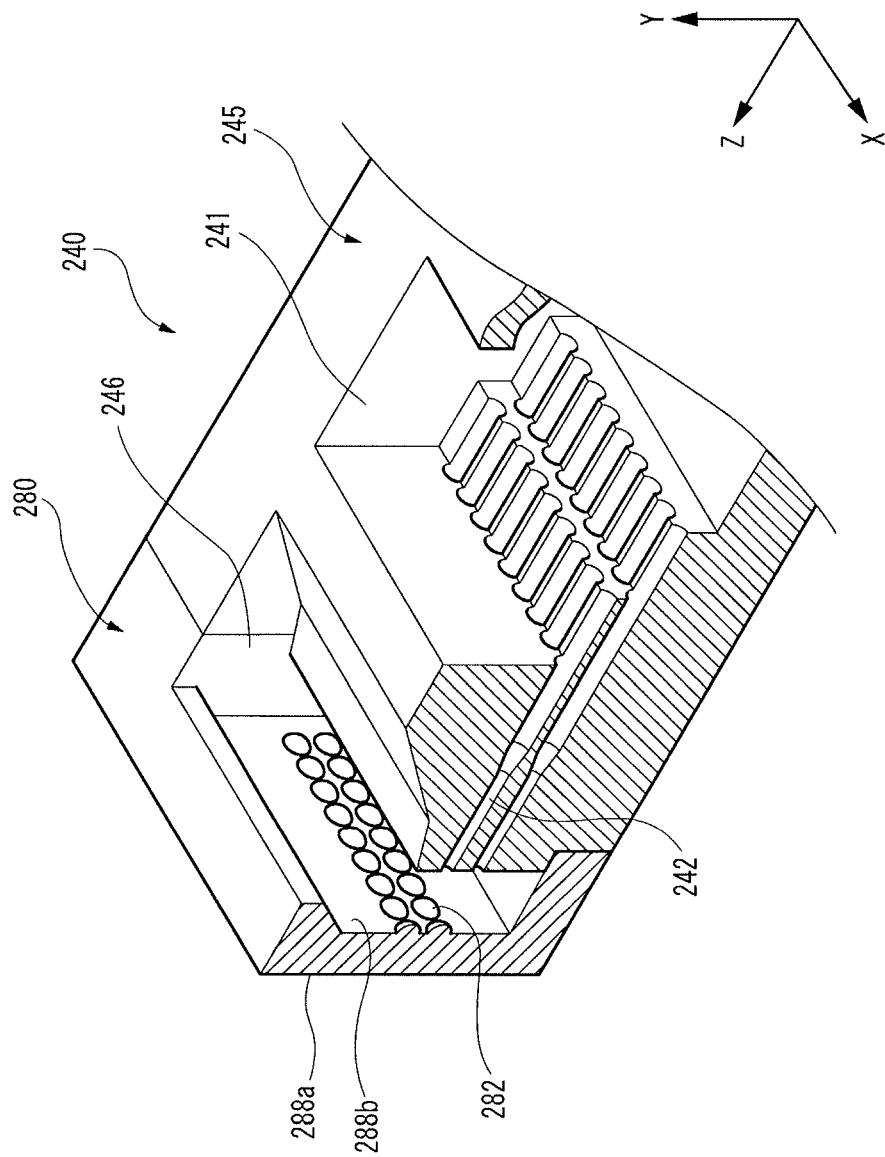
FIG. 15 is a sectional perspective view of the first ferrule shown in FIG. 14 and the vicinity thereof.

As shown in FIGS. 14 and 15, the first ferrule 240 has a first main body part 245 configured to hold the end portions of the first optical fibers 52, and a first lens array 280. The first main body part 245 has a window part 241, a plurality of optical fiber holding holes 242 arranged in parallel in the X-axis direction, a rear end portion 247, and an adhesive introduction part 246.

In the Z-axis direction, the first lens array 280 is arranged on the first main body part 245. The first lens array 280 has the first optical interface part IF-1, which is configured to expand and emit the light beams emitted from the first optical fibers 52, guide holes 284 extending from the first lens array 280 in the −Z direction, and a guide pin 283 protruding from the first lens array 280 in the +Z direction. The first optical interface part IF-1 has a plurality of collimate lenses 282 arranged in parallel in the X-axis direction.

The first lens array 280 has a front surface 288*a* and a rear surface 288*b* positioned at an opposite side to the front surface. The front surface 288*a* of the first lens array 280 is a surface that is to contact the outer surface 364*a* of the spacer 360.

The plurality of collimate lenses 282 is formed on the rear surface 288*b* of the first lens array 280. The adhesive is supplied into the adhesive introduction part 246 and the supplied adhesive is cured, so that the first optical fibers 52 corresponding to the collimate lenses 282 are optically connected to each other through the adhesive.

The collimate lenses 282 are configured to expand the light beams emitted from the first optical fibers 52. For example, the collimate lenses 282 are configured to collimate the diverging lights emitted from the first optical fibers 52 and to emit the parallel lights in the +Z direction. Also, the collimate lenses 282 are configured to condense the light beams, which are the parallel lights incident to the collimate lenses 282 of the first optical interface part IF-1 from the second optical interface part IF-2, and to couple the same with the first optical fibers 52.

The guide pin 283 is a guide pin for a multimode optical fiber and is manufactured so that an error of an outer diameter of the guide pin at each position in an axis direction thereof as regards a predetermined design value is equal to or less than +1.0 μm. The merits that are obtained when the guide pin for a multimode optical fiber is used are the same as the first exemplary embodiment.

In the meantime, as described above, since the second optical connector has the same structure as the first optical connector, the descriptions thereof are here omitted.

(Operational Effects of Adapter 2*c* of Third Modified Example)

The adapter 2C of this modified example can also accomplish the same operational effects of the adapter 2 of the first exemplary embodiment. According to the adapter 2C of this modified example, since the spacer 360 is integrally formed with the adapter 2C, it is possible to further reduce the number of components. Also, according to the first ferrule 240, since the guide pin 283 is integrally formed with the first lens array 280, it is possible to further reduce the number of components.

Although the exemplary embodiments of the present invention have been described, the technical scope of the present invention is not construed to be limited to the exemplary embodiments. One skilled in the art can understand that the exemplary embodiments are just exemplary and a variety of changes to the exemplary embodiments can be made within the scope defined in the claims. The technical scope of the present invention should be determined on the basis of the scope defined in the claims and the equivalent scope thereto.

For example, in the first exemplary embodiment, the first optical interface part IF-1 and the second optical interface part IF-2 include the GRIN lenses. However, instead of the GRIN lenses, the collimate lenses 282 described in the third modified example can be used.

Also, in the first exemplary embodiment, the spacer 60 is mounted with the pair of guide pins 63. However, the first optical connector 10 or the second optical connector 100 is provided with a pair of guide pins, so that one optical connector may be configured as a male optical connector and the other optical connector may be configured as a female optical connector.

Also, in the first exemplary embodiment, the spacer 60 is formed with the recess portions 68*a*, 68*b*. However, the spacer 60 may not be formed with the recess portions 68*a*, 68*b*. For example, when it is necessary to set the predetermined interval between the first optical interface part IF-1 and the second optical interface part IF-2 to the distance d2 between the outermost surface 64*a*A and the outermost surface 64*b*A, the spacer 60 may not be formed with the recess portions 68*a*, 68*b*. Also, when the predetermined interval is greater than the distance d2, the spacer 60 may be formed with a convex part. In this way, it is possible to appropriately set the predetermined interval, depending on the optical characteristics of the lenses provided for the optical interface part. Also, it is possible to appropriately set the depths of the recess portions 68*a*, 68*b* of the spacer 60, depending on the predetermined interval.

Also, in the first exemplary embodiment, at the second state, the inner surface 66*a* of the first spacer part 61*a* and the inner surface 66*b* of the second spacer part 61*b* are contacted to each other. However, the inner surface 66*a* of the first spacer part 61*a* and the inner surface 66*b* of the second spacer part 61*b* may not be contacted to each other, depending on the designs.

Also, in the first exemplary embodiment and the third modified example, the first lens array 80, 280 functioning as the first front end portion is separately configured from the first main body part 45, 245. However, the first lens array and the first main body part may be integrally formed. Likewise, the second lens array and the second main body part may be integrally formed. That is, the first front end portion and the second front end portion should be understood as the end portions of the first ferrule and the second ferrule and should not be construed to be limited to the first lens array 80, 280 and the second lens array 180 of the exemplary embodiments.

Also, the first optical interface part IF-1 is flush with the front surface 88*a* of the first lens array 80. However, the first optical interface part IF-1 may be provided at a position recessed from the front surface 88*a*. Likewise, the second optical interface part IF-2 may be provided at a position recessed from the front surface 188*a* of the second lens array 180.

What is claimed is:

1. An adapter comprising:
    an optical connector accommodation part having:
        a first cavity in which a first optical connector having a first end portion is to be accommondated, and
        a second cavity in which a second optical connector having a second front end portion is to be accommodated; and
    a spacer having:
        a first surface configured to contact the first front end portion;
        a second surface positioned at an opposite side to the first surface and configured to contact the second front end portion, and
        a light transmission part configured to enable a light beam, which propagates between a first optical interface part provided at the first front end a second optical interface part provided at the second front end portion, to pass therethrough, and
    the spacer being arranged between the first cavity and the second cavity, wherein at a state where the first front end portion is contacted to the first surface and the second front end portion is contacted to the second surface, the first optical interface part and the second optical interface part face each other at a predetermined interval wherein the optical connector accommodation part further has a third cavity formed between the first cavity and the second cavity, wherein the spacer is accommodated in the third cavity, wherein at a first state before the first optical connector and the second optical connector are positioned with respect to each other through the spacer, the first surface and second surface of the spacer are contacted to inner wall surfaces defining the third cavity, and wherein at a second state after the first optical connector and the second optical connector are positioned with respect to each other through the spacer, the first surface and second surface of the spacer are spaced from the inner wall surfaces.

2. The adapter according to claim 1, wherein a distance between the first surface and the second surface at the second state is less than a distance between the first surface and the second surface at the first state.

3. The adapter according to claim 1, wherein the inner wall surfaces of the third cavity have a first inner wall surface facing the first surface and a second inner wall surface facing the second surface, and wherein the spacer further has:
a first spacer part having the first surface;
a second spacer part having the second surface, and
an elastic member configured to elastically couple the first spacer part and the second inner wall surface and to elastically couple the second spacer part and the first inner wall surface.

4. The adapter according to claim 1, wherein the spacer further has a guide pin, and wherein at a state where the guide pin is inserted into a guide hole formed at the first optical connector and a guide hole formed at the second optical connector, the first optical connector and the second optical connector are positioned with respect to each other.

5. An optical connector coupling system comprising:
a first optical connector comprising:
a first ferrule having a first holding part configured to hold an end portion of a first optical fiber and a first end portion having a first optical interface part optically coupled with the first optical fiber, and
a first housing configured to accommodate therein the first ferrule;
a second optical connector comprising:
a second ferrule having a second holding part configured to hold an end portion of a second optical fiber and a second end portion having a second optical interface part optically coupled with the second optical fiber, and
a second housing configured to accommodate therein the second ferrule, the second optical connector being arranged to face the first optical connector; and
the adapter according to claim 1,
wherein the first optical interface part protrudes from the first housing in an insertion direction in which the first optical connector is to be inserted into the adapter, and
wherein the second optical interface part protrudes from the second housing in an insertion direction in which the second optical connector is to he inserted into the adapter.

6. The optical connector coupling system according to claim 5, wherein the adapter is engaged with the first housing and the second housing, and wherein at a state where the first ferrule and the second ferrule are positioned and coupled with respect to each other, the first ferrule is accommodated in the first housing so that it can move relative to the first housing, and the second ferrule is accommodated in the second housing so that it can move relative to the second housing.

7. The optical connector coupling system according to claim 5, wherein the first optical interface part is configured to optically couple with the first optical fiber, and to expand the light beam emitted from the first optical fiber, wherein the second optical interface part is configured to optically couple with the second optical fiber and to condense the light beam emitted from the first optical interface part on the second optical fiber, wherein the first optical fiber and the second optical fiber are single mode optical fibers, wherein the spacer further has a guide pin for a multimode optical fiber, and wherein at a state where the guide pin is inserted into a guide hole formed at the first optical connector and a guide hole formed at the second optical connector, the first optical connector and the second optical connector are positioned with respect to each other.

8. The optical connector coupling system according to claim 5, wherein the spacer further has:
a first spacer part having the first surface;
a second spacer part having the second surface, and
a spacer elastic member configured to elastically couple the first spacer part and the second spacer part, wherein the first optical connector further has a first elastic member configured to press the first ferrule so that the first front end portion is contacted to the first surface of the spacer, wherein the second optical connector further has a second elastic member configured to press the second ferrule so that the second front end portion is contacted to the second surface of the spacer, and wherein at the second state, elastic forces of the first elastic member and the second elastic member are higher than an elastic force of the spacer elastic member.

9. An adapter comprising:
an optical connector accommodation part having:
a first cavity in which a first optical connector having a first front end portion is to be accommondated, and
a second cavity in which a second optical connector having a second front end portion is to be accommodated; and
a spacer having:
a first surface configured to contact the first front end portion;
a second surface positioned at an opposite side to the first surface and configured to contact the second front end portion, and
a light transmission part configured to enable a light beam, which propagates between a first optical interface part provided at the first front end a second optical interface part provided at the second front end portion, to pass therethrough, and
the spacer being arranged between the first cavity and the second cavity, wherein at a state where the first front end portion is contacted to the first surface and the second front end portion is contacted to the second surface, the first optical interface part and the second optical interface part face each other at a predetermined interval wherein the spacer further has:

a first spacer part having the first surface;

a second spacer part having the second surface, and a spacer elastic member configured to elastically couple the first spacer part and the second spacer part.

* * * * *